US012769644B1

(12) United States Patent
Provine

(10) Patent No.: US 12,769,644 B1
(45) Date of Patent: Oct. 20, 2026

(54) FREE BLOCK ADDRESS MANAGEMENT FOR COMPRESSED DATA STORAGE

(71) Applicant: Astera Labs, Inc., Santa Clara, CA (US)

(72) Inventor: Justina Provine, Fremont, CA (US)

(73) Assignee: Astera Labs, Inc., Santa Clara, CA (US)

( * ) Notice: Subject to any disclaimer, the term of this patent is extended or adjusted under 35 U.S.C. 154(b) by 91 days.

(21) Appl. No.: 18/906,070

(22) Filed: Oct. 3, 2024

(51) Int. Cl.
*G06F 12/02* (2006.01)

(52) U.S. Cl.
CPC ...... *G06F 12/023* (2013.01); *G06F 2212/401* (2013.01)

(58) Field of Classification Search
CPC ......................... G06F 12/023; G06F 2212/401
See application file for complete search history.

(56) References Cited

U.S. PATENT DOCUMENTS 5,652,857 A * 7/1997 Shimoi ................. G06F 3/0601 711/E12.019
6,401,181 B1 * 6/2002 Franaszek ........... G06F 12/1009 711/170
2022/0179735 A1 * 6/2022 Brewer ............... G06F 11/1068
2022/0404998 A1 * 12/2022 Prasad .................. G06F 3/0679

* cited by examiner

*Primary Examiner* — Chie Yew
(74) *Attorney, Agent, or Firm* — Colby Nipper PLLC

(57) ABSTRACT

The present disclosure describes aspects of free block address management for compressed data storage. In various aspects, a memory controller maintains addresses of free blocks of a memory through a linked list of address storage blocks stored in the memory. An address storage block may include addresses of the free blocks of the memory and an address to a next address storage block of the linked list (e.g., block freelist). As the memory controller writes data to the free blocks of the memory and consumes the addresses stored in the address storage blocks, the memory controller can release the address storage blocks as free blocks. When the free blocks and associated addresses are used up, the remaining address storage blocks are released, and no memory is needed to maintain the list of free blocks. By so doing, the described aspects can reduce free block management overheard and improve memory efficiency.

20 Claims, 14 Drawing Sheets

FREE BLOCK ADDRESS MANAGEMENT FOR COMPRESSED DATA STORAGE

BACKGROUND

Operating systems and memory management algorithms often implement data compression schemes to dynamically reduce the size of data before writing the data from cache to memory of a computing system. Generally, pages of data are compressed before the compression scheme writes the smaller compressed page of data to the memory. In addition to the compression and decompression operations, to enable loading and use of the compressed data, the compression scheme also maintains information describing the data of the compressed page and tracks where the compressed page is written into the memory. As memory capacity, page size, and address space sizes continue to increase, maintaining and tracking the information necessary to support compressed data storage places additional overhead on memory system resources, which can constrain bandwidth, increase latency, and reduce efficiency of the memory system.

SUMMARY

This summary is provided to introduce subject matter that is further described in the Detailed Description and Drawings. Accordingly, this Summary should not be considered to describe essential features nor used to limit the scope of the claimed subject matter.

In some aspects, a method for managing addresses of free blocks of a memory includes receiving, at a memory controller and from a host, a request to store data to a memory coupled to the memory controller. The method compresses the data to provide compressed data and obtains addresses of free blocks of the memory from a block of address information. In some implementations, the block of address information is part of a block freelist that is stored in the memory as multiple blocks of address information. The method then writes, based on the addresses obtained from the block of address information, the compressed data to the free blocks of the memory.

In other aspects, an apparatus includes a host interface, a memory interface, a compression engine, a hardware-based processor configured to execute instructions, and a hardware-based memory storing processor-executable instructions. Responsive to execution, the instructions implement a memory controller with free block address management that is configured to receive, via the host interface, a request to store data to a memory coupled to the memory interface. The compression engine can compress the data to provide compressed data. The memory controller is also configured to obtain addresses of free blocks of the memory from a block of address information, which may be implemented as part of a block freelist stored in the memory as multiple blocks of address information. Based on the addresses obtained from the block of address information, the memory controller writes the compressed data to the free blocks of the memory.

In yet other aspects, an apparatus includes a host interface, a memory interface, a compression engine, and means for free block address management that receive, via the host interface, a request to store data to a memory coupled to the memory interface. The means may then compress, via the compression engine, the data to provide compressed data and obtain addresses of free blocks of the memory from a block of address information of a block freelist. In some implementations, the block freelist is stored in the memory as multiple blocks of address information. Based on the addresses obtained from the block of address information, the means write the compressed data to the free blocks of the memory.

BRIEF DESCRIPTION OF THE DRAWINGS

Apparatuses for and techniques of implementing free block address management for compressed data storage are described with reference to the following drawings. The use of same numbers in the drawings and associated description may reference like features and elements.

DETAILED DESCRIPTION

Figure 1:
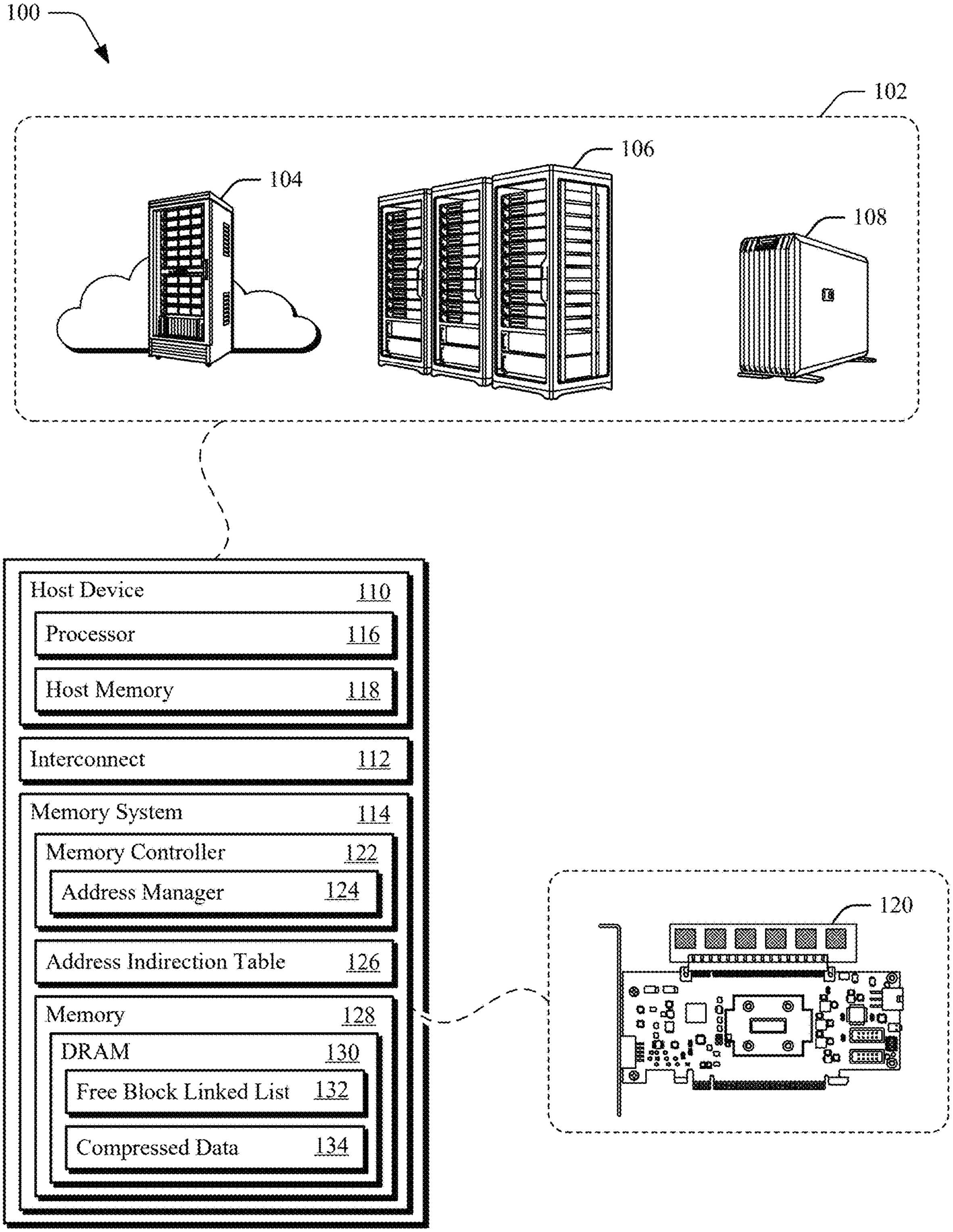
FIG. 1 illustrates an example environment in which aspects of free block address management for compressed data storage can be implemented.

Computing systems and servers often implement data compression schemes to dynamically reduce the size of data before writing the data from cache to memory of the computing system or the server. Generally, pages of data can be compressed before the compression scheme writes the smaller compressed page of data to the memory. For example, a memory compression scheme can compress pages from a host and store the compressed page data to smaller blocks of an external memory. To fetch back the compressed data, a host uses a page address maintained through an address table that is configured to map page addresses to corresponding blocks of memory that store the compressed data. As such, the compression scheme incurs bandwidth overhead because the block address mappings stored in the address table are read when the compression scheme writes a compressed page or retrieves a compressed page. Memory resources dedicated to the address table for supporting the compression scheme must also be large enough to accommodate the entire address space maintained through the table, which affects capacity overhead. Additionally, addresses of the memory blocks need to be stored by the compression scheme, where a smaller block size enables more efficient memory utilization for the compressed pages. Reducing block size, however, increases the number of block addresses that need to be stored, requiring the allocation of yet more memory resources for the block address table. Accordingly, the preceding data compression schemes and block tracking techniques are inefficient due to the capacity overhead and bandwidth penalties associated with managing access of blocks of compressed data through conventional address tables.

This disclosure describes apparatuses for and techniques of free block address management for compressed data storage that can reduce overhead and improve memory efficiency. The described aspects can advantageously implement a list of free blocks (or block freelist) with no impact on available memory capacity of memory (e.g., external memory, non-native memory) available to the host, as a linked list maintained through linked blocks of address information stored within the memory. While an indirection table for page address to block mapping, and its associated overhead, is typically defined by a host-side configuration, a memory system can be configured to implement aspects of free block address management as described herein, which may eliminate block address capacity overhead and reduce a bandwidth penalty on a per transaction basis. For example, in preceding compression schemes, a memory controller reserves a partition of memory to store addresses of free blocks, which prevents a host from using that partition and the entire memory for storing compressed data. Further, for compressed memory schemes to operate efficiently, the memory controller must allocate the memory into smaller blocks in relation to an address space for storing uncompressed data. The use of smaller blocks results in more block addresses, which in turn increases the size of the free block list and the corresponding partition (e.g., unusable memory area) that the preceding techniques reserved for tracking the free block addresses. As described herein, the aspects of free block address management for compressed data storage can implement a block free list as a linked list of address storage blocks in a memory, which are released for use as host storage as a memory controller consumes the addresses of the free blocks to store compressed data to the memory. Conversely, when data is read from the blocks of memory, the memory controller generates more free blocks of memory and as memory is required to save the block free addresses, the memory controller allocates some of the free blocks of memory for storing additional entries to the block free list (e.g., to build a linked list of free block addresses). Thus, the described aspects can manage free block addresses without reserving a static memory partition, thereby enabling the host to use the entire memory to store compressed data and avoid incurring a penalty on available memory capacity.

In various aspects of free block address management, a free block address manager (address manager) or memory controller can divide a memory (e.g., external memory) into blocks and initially allocate some of the blocks to store block addresses within the memory. Generally, the address manager maintains a freelist of blocks as a linked list formed by linking these blocks that hold the block addresses as a chain of block address information. A block storing addresses, which may be implemented as a block of address information or an address storage block, may include an address (e.g., a block link address) that links the block to a next address storage block in the linked list.

As the block addresses are used up or consumed when the memory controller writes compressed data to the memory, the address storage blocks are freed and released to the freelist. When the freelist is empty (e.g., memory reaches full occupancy), no memory is used to maintain the block freelist such that the described aspects incur zero capacity overhead. When blocks are released during page release, the address manager can build the block freelist again as block addresses are packed and collected in an address storage block. The address manager can claim one of the freed or released blocks of memory as a next block to store the block addresses. The address manager can insert an address of the next block into the current address storage block to link that next address storage block as part of the linked list. In other words, the address manager may consume addresses of and release the linked blocks of addresses with writes of compressed data and form linked blocks of addresses from available blocks that are released by reads of compressed data. Examples of these and other operations for implementing free block address management are described throughout this disclosure.

In various aspects, a memory controller, or address manager thereof, collects addresses of free blocks of a memory in an address storage block that is stored to a memory (e.g., external memory, non-native memory). In some implementations, the memory controller configures the memory into blocks and may designate or allocate a portion of the blocks as address storage blocks. The memory controller may also insert, into the address storage block, a block address as a link to another address storage block to form a linked list of free blocks of the memory. As the memory controller writes compressed data to the free blocks of the memory and consumes the addresses stored in the address storage blocks, the memory controller can release the address storage blocks as free blocks, which may then be used to store additional compressed data. When the free blocks and associated addresses are used up, the remaining address storage blocks are released, and no memory is needed to maintain the list of free blocks. By so doing, the described aspects can reduce block management overhead and improve memory efficiency for compressed data storage.

The following discussion describes an operating environment, techniques that may be employed in the operating environment, an integrated circuit, and various memory systems in which components of the operating environment may be embodied. In the context of the present disclosure, reference is made to the operating environment, techniques, or various elements by way of example only.

FIG. 1 illustrates an example operating environment 100 having computing systems 102 in which aspects of free block address management for compressed data storage may be implemented. Examples of the computing system 102 include a computing cluster 104 of a cloud, servers 106 of a data center, and a computing workstation 108. Other examples of a computing system 102 may include a data storage device, an Internet-of-Things (IoT) device, a router, a wireless access point, a network-attached-storage (NAS) device, a smart-phone, a netbook, a tablet computer, an access point, a network-attached storage, a camera, a smart appliance, a printer, a set-top box, a server, a solid-state drive (SSD), an automotive computing system, or any other suitable type of device. A computing system 102 may process, communicate, or store data for any suitable purpose, such as to enable functionalities of a particular type of a device, an application, a virtual machine (VM), cloud service, memory system, cache system, storage system, or the like.

In example implementations, the computing system 102 includes a host device 110, an interconnect 112, and a memory system 114 (e.g., external memory, pooled memory, non-native memory). In some implementations, functions of the computing system 102 may be distributed across multiple electronic devices, such as the host device 110 being incorporated as part of a computing main board (e.g., server or workstation main board) while the memory system 114 is incorporated as part of a discrete, packaged component (e.g., peripheral card), or as part of a memory module of a device. The host device 110 can include a processor 116 and host memory 118 (e.g., computer-readable media), which may be configured as cache memory, volatile memory, and/or non-volatile memory of the host device 110. Although not shown, the host device 110 may also include a memory controller to enable memory access operations of the host device 110 with the host memory 118. In some implementations, the processor 116 is coupled to cache memory (not shown), and the cache memory coupled to the memory controller of the host device 110. Thus, the processor 116 may be coupled, directly or indirectly, to the memory controller. The processor 116 may be configured as a processor core, application processor, a central processing unit (CPU), a graphics processing unit (GPU), a neural network engine or accelerator, an application-specific integrated circuit (ASIC), a field-programmable gate array (FPGA), integrated circuit (IC), a communications processor (e.g., a modem or baseband processor), a system-on-chip (SoC), and so forth.

The host memory 118 or computer-readable media of the host device 110 may be realized, for example, with a dynamic random-access memory (DRAM) die or module, including a three-dimensional (3D) stacked DRAM device, such as a high bandwidth memory (HBM) device or a hybrid memory cube (HMC) device. The host memory 118 (e.g., local memory, native memory) may operate as a cache and/or main memory of the host device 110. Although not shown, the host device 110 can also include storage memory. The storage memory may be realized, for example, with a storage-class memory device, such as one employing 3D XPoint™ or phase-change memory (PCM), a solid-state drive, or flash memory. Generally, the host device 110 may store data to the host memory 118 and/or read the data from the host memory 118. The interconnect 112 couples the host device 110 with the memory system 114 of the computing system. In some implementations, the interconnect 112 is configured as a compute express link (CXL) interconnect over a peripheral component interconnect express (PCIe) interface. Thus, the host device 110 and the memory system 114 may communicate using transaction packets or "flits" compliant with a CXL input/output (CXL.io) protocol, CXL memory (CXL.mem) protocol, or any other suitable CXL protocol. In some aspects, the host device 110 issues write and/or store commands to the memory system 114 over the interconnect 112 as CXL.mem transactions packets to store data (e.g., pages of compressed data) to the memory system 114. Additionally or alternatively, the host device 110 can issue read and/or load commands to the memory system 114 over the interconnect 112 as CXL.mem transactions packets to access data stored by the memory system 114.

The memory system 114, which in this example is illustrated as a memory peripheral card 120, includes a memory controller 122 that is operably coupled with the host device 110 via the interconnect 112. The memory system 114 may be implemented as an external memory, a non-native memory, pooled memory, expanded memory, or extended memory of the computing system 102. In aspects, the memory controller 122 includes a free block address manager 124 (address manager 124) to implement the aspects described throughout this disclosure. The memory system 114 may also include an address indirection table 126 and a memory 128, which may be implemented as a dynamic random-access memory (DRAM) module 130. A memory space or area of the DRAM 130 may be divided into blocks (e.g., configurable-sized blocks) for storing data. In the blocks of DRAM, the address manager may store or maintain a free block linked list 132 (linked list 132) of addresses of free blocks and/or the memory controller may store compressed data 134. As described herein, the address manager 124 may implement the free block linked list 132 as a chain of linked address storage blocks (or blocks of address information) for maintaining a list of free blocks in the DRAM.

Generally, the memory controller 122 can be coupled to a physical interface (e.g., a high-level or logical interface) between the host device 110 and at least one memory of the memory system, such as one or more DRAM modules 130 of the memory 128. The memory controller 122 can, for example, communicate memory commands or requests with the host device 110 and provide the memory requests to a memory module or device with appropriate formatting, timing, and reordering in accordance with a memory access protocol or specification (e.g., protocols of a Double Data Rate 5 (DDR5), Double Data Rate 6 (DDR6), or subsequent DDR specifications). Although illustrated as DRAM 130, the memory 128 may include various types of random-access memory (RAM), static RAM (SRAM), or the like. Alternatively or additionally, the memory 128 may include read-only memory (ROM), electronically erasable programmable ROM (EEPROM) or flash memory (e.g., NOR flash or NAND flash). These memories, individually or in combination, may be used by the memory system 114 to store data associated with applications, tenants, workloads, initiators, virtual machines, and/or an operating system of the host device 110. As such, the described aspects of free block address management may be implemented with DRAM as illustrated, as well as with other types of memory (e.g., flash memory, memory system implemented as a CXL-coupled solid-state drive).

In various implementations, the memory system 114 can be configured as a memory resource for the host device 110. For example, the memory controller 122 can be configured to provide memory expansion, memory pooling, or memory sharing functionalities to one or more host devices 110 using the memory 128 and/or other memory devices coupled to the memory controller 122. In aspects, the memory controller 122 enables processor 116 of the host device 110 to coherently access the memory 128 with load and/or store commands for volatile (e.g., DRAM) or non-volatile (e.g., flash memory) storage. The memory system 114 can be configured to store data of the host device 110 and can compress pages of data for storage as the compressed data 134 to blocks of the DRAM 130. To access or fetch the compressed data from the memory system 114, the host device 110 may use the page address associated with the compressed blocks written to the memory 128. Accordingly, the memory system 114 may include or maintain the address indirection table 126 (and/or translation lookaside buffer (TLB)) to map page addresses to corresponding block addresses in the memory 128 at which the compressed data is stored.

While the address indirection table 126 tracks host-side page address mappings to the blocks of compressed data in the memory 128, the memory controller 122 can manage free space of the memory 128 with aspects of free block address management. The free space, or areas, of the memory may include areas to which compressed data has not been written or areas from which compressed data has been read, allowing release of the areas back to a pool or list of free area. In aspects of free block address management, the memory controller 122 includes a free block address manager 124 (address manager 124) to manage addresses of free blocks (or free areas) of the memory 128 using a linked list stored within the memory. Alternatively or additionally, the address manager 124 can initialize an area of the memory 128 by dividing the memory into blocks and initially allocating some of the blocks within the memory to store block addresses. In some aspects, the address manager 124 maintains a freelist of blocks as a linked list formed by linking the blocks that hold the free block addresses as a chain of address information blocks within the memory 128.

For example, the address manager 124 may insert, into an address storage block, an address (e.g., a block link address) that links the block to a next address storage block in the linked list or sequence of address storage blocks. As the memory controller 122 uses up or consumes the block addresses when writing data to the blocks of the memory, the address manager 124 can free up and/or release an address storage block to the freelist maintained as blocks in the memory. In some cases, when the address manager 124 releases a last address storage block for use to store compressed data (e.g., memory reaches full occupancy), none of the memory 128 is used to maintain the freelist such that the described aspects incur zero capacity overhead. Alternatively, when the memory controller 122 frees blocks during a corresponding page release, the address manager 124 can build the linked list of free block addresses, packing and collecting addresses of the free blocks in an address storage block. As the blocks of the memory 128 are freed up, the address manager 124 claim and link some of the freed blocks to store the block addresses. In other words, the address manager 124 may consume the addresses of and release the linked blocks of addresses with writes of compressed data to the memory and form linked blocks of addresses with addresses released by reads of the compressed data. Additional configurations and operations implemented by the address manager 124 are described throughout this disclosure.

Figure 2:
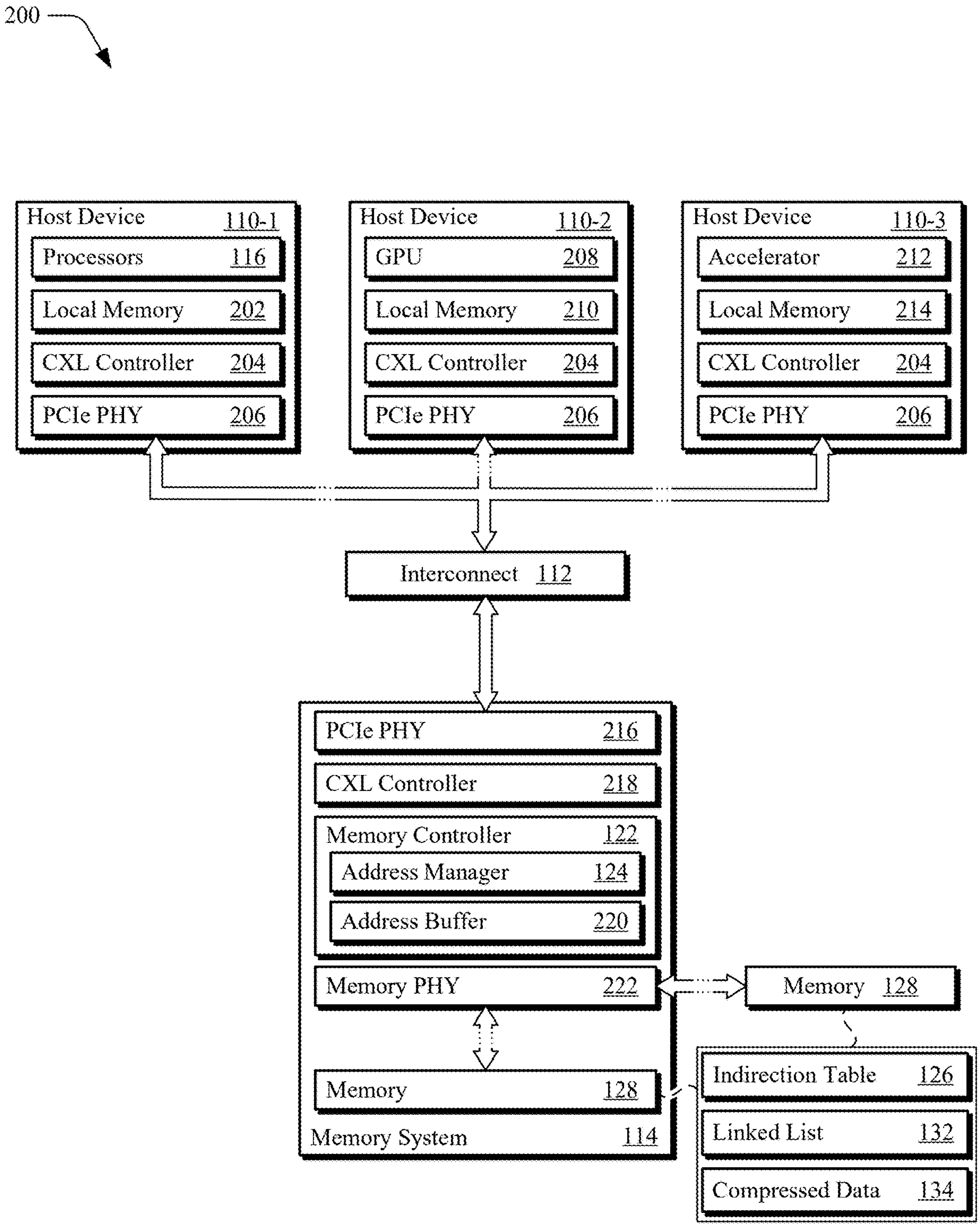
FIG. 2 illustrates example configurations of computing systems that can implement aspects of free block address management.

FIG. 2 illustrates at 200 example configurations of computing systems that can implement aspects of free block address management. The computing systems 200 may represent example configurations of the host device 110, interconnect 112, memory system 114 as described with reference to FIG. 1. As shown in FIG. 2, the host devices 110 in this example include a computing host 110-1, a graphical processing unit host 110-2 (GPU host 110-2), and an accelerator host 110-3. Generally, a computing system 102 can be configured to include one or more host devices 110, a memory system 114, and one or more memories 128. In various aspects, the memory system 114 (e.g., external memory) may be configured to implement memory expansion to expand host memory, memory pooling for multiple host devices, or memory sharing between multiple host devices. The illustrated host devices 110 of FIG. 2 are presented as examples, and the memory system 114 may be coupled with other types of hosts or processing platforms to implement aspects of free block address management.

With reference to the example host devices 110, the computing host 110-1 can include processors 116, which may be implemented as described with reference to FIG. 1, and local memory 202. The local memory 202 can include any suitable type of volatile memory and/or non-volatile memory, such as cache memory or DRAM operably coupled with the processors 116 of the host device. The processors 116 may process instructions to implement various applications, workloads, initiators, virtual machines, or an operating system of the host device 110, any of which may store data to the memory system 114. Although not shown, the computing host 110-1 may also include a compression engine to compress data that is transferred to the memory system 114 or decompress data read back from the memory system. In this example, the computing host 110-1 includes a CXL controller 204 (e.g., CXL root port) configured to enable communication with the memory system 114 over the interconnect 112 and a PCIe physical interface 206 (PCIe PHY 206) over which the CXL controller 204 may implement various CXL protocols.

The GPU host 110-2 includes a GPU 208 and local memory 210 that is operably coupled with the GPU 208. The GPU 208 may include or be configured as an ASIC, artificial intelligence (AI) engine, a machine-learning (ML) engine, a digital signal processing (DSP) engine, a scalar engine, or the like. The local memory 210 of the GPU host 110-2 can include any suitable type of volatile memory and/or non-volatile memory, such as an HBM device or DRAM modules operably coupled with the GPU 208 and/or other engines of the GPU host 110-2. The GPU 208 may execute AI or ML workloads with data that is stored to the memory system 114. Although not shown, the GPU host 110-2 may also include a compression engine to compress data that is transferred to the memory system 114 or decompress data read back from the memory system. In this example, the GPU host 110-2 includes an instance of a CXL controller 204 configured to enable communication with the memory system 114 and an instance of a PCIe PHY 206 over which the CXL controller 204 can implement various CXL protocols.

In some implementations, the accelerator host 110-3 includes an accelerator 212 and local memory 214, which may include a cache or DRAM operably coupled to the accelerator. The accelerator 212 may include application-specific architecture to optimize processing for various functions, such as communication (fifth-generation (5G) cellular networks), cybersecurity, AI, ML, automation, machine vision, and so forth. In some aspects, the accelerator host 110-3 stores data to the memory system 114 over the interconnect 112. Although not shown, the accelerator host 110-3 may also include a compression engine to compress data that is transferred to the memory system 114 or decompress data read back from the memory system. In this example, the accelerator host 110-3 includes an instance of a CXL controller 204 configured to enable communication with the memory system 114 and an instance of a PCIe PHY 206 over which the CXL controller 204 can implement various CXL protocols.

As shown in FIG. 2, the memory system 114 can be implemented with a PCIe PHY 216 and a CXL controller 218 to enable communication of data and commands with one or more host devices 110 via the interconnect 112. The memory system 114 also includes an instance of a memory controller 122 with an address manager 124 and an address buffer 220 for storing a portion of the free block linked list 132, which may be loaded or copied into the address buffer of the memory controller. Alternatively, the memory controller 122 may include an address cache (not shown) for caching a portion of the free block linked list (e.g., an address storage block). In such cases, the address manager 124 may maintain coherency between the address cache and the free block linked list stored in the memory 128. Generally, the memory controller 122 may communicate with a host device 110 to execute commands to store data to and load data from the memory 128 operably coupled with the memory system 114 via a memory physical interface 222 (memory PHY 222). In this example, the memory 128 may include memory embodied as part of the memory system 114 or external memory coupled with the memory PHY 222. For example, the memory 128 may include one or more DRAM modules soldered onto or coupled with a PCB assembly that forms the memory system 114. Alternatively or additionally, the interconnect 112 and memory system 114 may be embedded with a host device 110 as a PCB assembly (e.g., mainboard or server blade). Generally, the memory controller 122 may store data of the one or more host devices 110 as compressed data 134 to blocks of the memory 128 in accordance with the aspects described throughout the disclosure. In some implementations, the memory 128 or another memory of the memory system 114 may store an indirection table 126, the free block linked list 132, and/or the compressed data 134.

Figure 3:
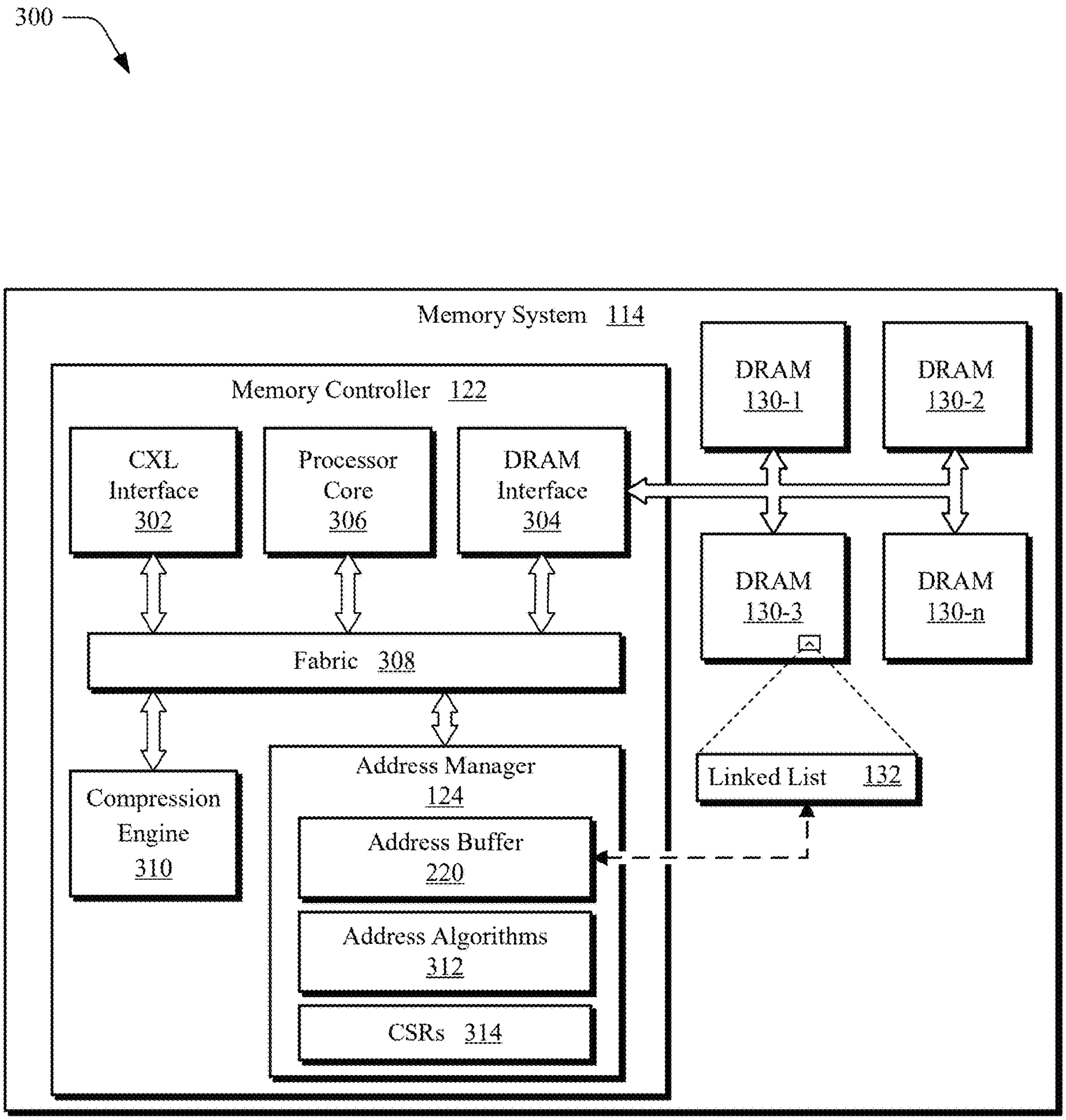
FIG. 3 illustrates an example memory system configured in accordance with one or more aspects of free block address management.

FIG. 3 illustrates at 300 an example memory system (e.g., memory apparatus, external memory) configured in accordance with one or more aspects of free block address management. In this example, the memory controller 122 and address manager 124 are illustrated in the context of a memory system 114 that includes multiple DRAMs 130-1 through **130-*n* (e.g., DRAM modules, DRAM devices), where n can be any suitable integer. Alternatively or additionally, the memory system 114 may be operably coupled with external memory through which the described aspects may be implemented. Generally, the address manager 124 may interact with the host device 110, memory controller 122, DRAM 130, and/or components of the memory system 114** to implement aspects of free block address management for compressed data storage.

To enable communication with a host device 110, the memory controller 122 includes a CXL interface 302, which may include a CXL controller for implementing CXL protocols and/or a PCIe PHY to provide a physical interface over which data and CXL commands are communicated. The memory controller 122 also includes a DRAM interface 304, which may be configured to implement memory protocols (e.g., DDR5, DDR6 protocols) for transferring data to and from any of the DRAMs 130-1, 130-2, 130-3, through **130-*n*. In aspects, the memory controller 122 can be implemented by executing processor-executable instructions (e.g., firmware) stored on a non-volatile memory (not shown, e.g., ROM, SRAM, or flash) of the memory controller that, responsive to execution, directs the memory controller or components thereof to perform operations or acts described herein. In some implementations, the address manager 124 operates as part of or with the memory controller 122 to perform aspects of free block address management. As such, the address manager 124 may be implemented by the processor core 306 executing the processor-executable instructions stored on a hardware-based memory of the memory controller. The memory controller 122 also includes a fabric 308 (or other internal bus, crossbar) for transferring data and/or commands between components of the controller and a compression engine 310 (e.g., compression block, compression module) for compressing data to provide compressed data or decompressing compressed data to provide uncompressed data. In some implementations, the host device 110 may communicate data (e.g., uncompressed data) with the memory system 114, which the compression engine 310 compresses to provide compressed data for the memory controller 122 to write to the data to blocks of the DRAM 130. Conversely, the compression engine 310 can decompress the compressed data read from the blocks of DRAM 130 before the memory controller 122 transfers the uncompressed data to the host device 110. As noted with reference to the host devices 110**, the data compression operations and/or the data decompression operations may also be implemented at a host device.

In this example, the address manager 124 includes an address buffer 220, free block address management algorithms 312 (address algorithms 312) and control and setting registers 314 (CSRs 314), which may include registers or data structures for maintaining settings and/or state information of the address manager and/or block freelist. Generally, the address buffer 220 can be configured to buffer multiple block addresses of the free block linked list 132 stored in memory 128 or DRAM 130. For example, the address buffer 220 may be configured to buffer or hold a block of address information, a cache line of a block of address information, multiple blocks of address information, or the like. In various aspects, the address manager 124 may load or pop a block of address information or an address storage block from the free block linked list 132 to the address buffer 220 to obtain addresses of free blocks, which may be used to write data to the memory. The address manager 124 may also store addresses of free blocks in the address buffer 220 and push or store those addresses to a block of the memory to add another address storage block to the free block linked list 132. Alternatively, the memory controller 122 or address manager 124 may include an address cache (not shown) for caching a portion of the free block linked list (e.g., an address storage block). In such cases, the address manager 124 may maintain coherency between the address cache (e.g., on-chip address cache) and the free block linked list 132 stored in memory 128.

The free block address management algorithms 312 (address algorithms 312) may include algorithms, programs, routines, functions, counters, or the like for initializing memory and/or implementing aspects of free block address management in association with memory access operations (e.g., reads, writes) implemented by the memory controller 122. In aspects, the address algorithms 312 may implement operations described with reference to the methods of FIGS. 6, 7, 8, 10, 12, and 13 to enable and manage the free block linked list 132 of free block addresses stored in the memory 128 or DRAM 130. For example, when the address manager 124 initializes or completes an address storage block, an address algorithm 312 can insert, into the address storage block, an address (e.g., a block link address) that links the block to a next address storage block in a linked list of free blocks. When the memory controller 122 writes compressed data to blocks of the DRAM 130 and the addresses of the address storage block are exhausted, an address algorithm 312 can free up and release the address storage block to the free block linked list 132. Thus, the free (e.g., released) address storage block is removed from the linked list of address storage blocks and is made available to the host as available memory. In other cases, when the memory controller 122 reads compressed data from a block of the DRAM 130, an address algorithm 312 can release the block based on a corresponding page release and store an address of the released block to the freelist.

The CSRs 314 may include registers and/or data structures useful for maintaining control settings, configuration information, state information, or the like for the address manager 124 and/or free block linked list 132. For example, the address manager 124 may initialize, based on the CSRs 314, an area, module, or device of the DRAM 130 by dividing the memory into configurable-sized blocks and initially allocating some of the blocks as address storage blocks to store block addresses within the memory. In various implementations, the CSRs 314 may include a freelist block count (or counter) for tracking a number of free blocks in the freelist, a block link count (or counter) for tracking a number of linked blocks in the freelist, a block link head pointer (e.g., for the address buffer 220 and/or the linked list 132 in memory) for tracking a head block (e.g., first or starting block) in the freelist, and so forth. The settings of the CSRs 314 may include any suitable type of parameters, which may include a size of the memory, a size of blocks for data or address storage, a number of blocks to allocate for address storage, a size of a partition or section to create for the address storage blocks, or the like. These and other operations implemented by the address manager 124, address algorithms 312, and/or CSRs 314 are described further with reference to the methods of FIGS. 6, 7, 8, 10, 12, and 13.

Figure 4:
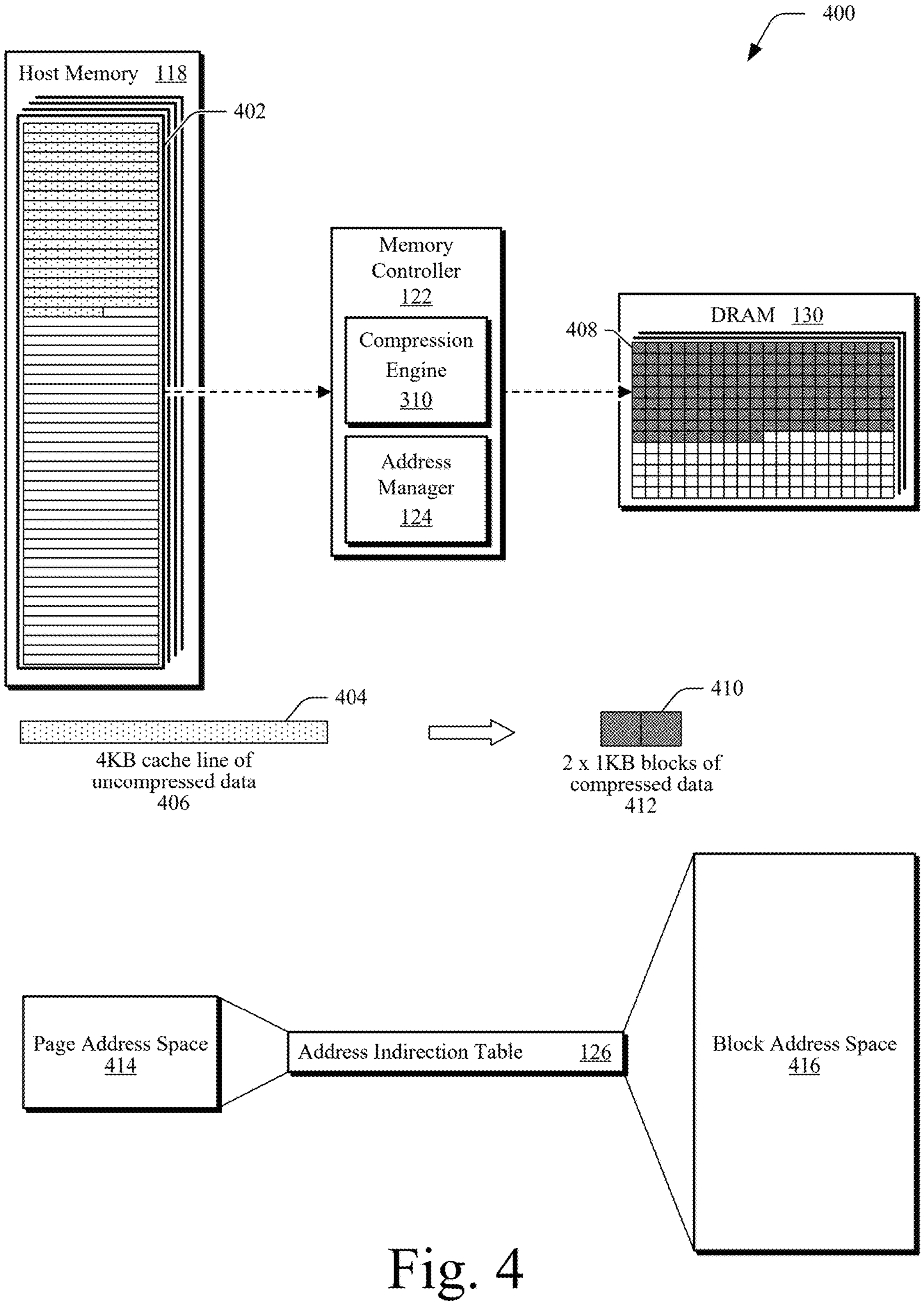
FIG. 4 illustrates examples of data compression and address space mapping in accordance with one or more aspects.

FIG. 4 illustrates at 400 examples of data compression and address space mapping in accordance with one or more aspects of free block address management. In this example, a host memory 118 (e.g., local memory, native memory) may include or maintain one or more pages 402 of data associated with various workloads or applications executing on a host device. Generally, a page 402 of the data may include multiple cache lines 404 of data, which in this example are configured as 4 KB cache line(s) 406 of uncompressed host data. In various aspects, a host may send a page 402 of host data to the memory controller 122 for storage to the DRAM 130 (e.g., external memory) or other memory coupled to the memory controller. The memory controller 122 can use compression engine 310 to compress the data and then write the compressed data of the page to blocks 408 of the DRAM 130. The DRAM 130 may be divided or configured with blocks of any suitable size, and in this example the DRAM 130 is divided into 1 KB blocks 410, though any block size may be used. The compression engine 310 may implement any suitable compression algorithm and a compression ratio of the data may vary depending on the algorithm and/or characteristics of the source data. In this example, assume the compression rate for the compression engine 310 is approximately 50 percent (50%±3-5%), such that the 4 KB cache line 406 yields 2 KB of compressed data, which the memory controller can write into the DRAM 130 as two 1 KB blocks of compressed data 412.

Due to a size difference between host pages and blocks of DRAM, the memory controller may implement and maintain the address indirection table 126 for mapping page addresses used by a host to block addresses used to access the DRAM 130. As shown in FIG. 4, the address indirection table 126 enables data access based on a translation of the page address space 414 to the block address space 416, which can be used by the memory controller to write data to and/or read data from (e.g., compressed data, address information) the DRAM 130. As noted, smaller block sizes of DRAM may enable more efficient utilization of the memory space, however, the smaller block size increases a number of blocks and corresponding block addresses, as indicated by the relative size of the block address space 416. In various aspects, a host may access data of local memory or the DRAM 130 based on a cache line address for data access. The host can determine a page address for the page that includes the cache line, and then lookup information in a page descriptor to determine if the page data is in local memory or stored to the DRAM 130 (e.g., as compressed data). When the requested page has been stored to DRAM, the host can request the page from the memory controller 122 and the memory controller can use the address indirection table 126 to locate and read the compressed data from the blocks that correspond to the requested page. The memory controller 122 can then use compression engine 310 to decompress the data and return the uncompressed data of the requested cache line or page to the host. To write data to the DRAM 130, the host may determine whether data of a cache line or page is to be stored to the DRAM and send the cache line or page of data to the memory controller 122. The memory controller 122 can use the compression engine 310 to compress the data and the address manager 124 provides addresses of free blocks in the memory to which the compressed data can be written. These are but a few examples of how the memory controller 122 may use the address manager 124 and address indirection table 126 to enable access of compressed data stored in the DRAM or another memory coupled to the memory controller.

Figure 5:
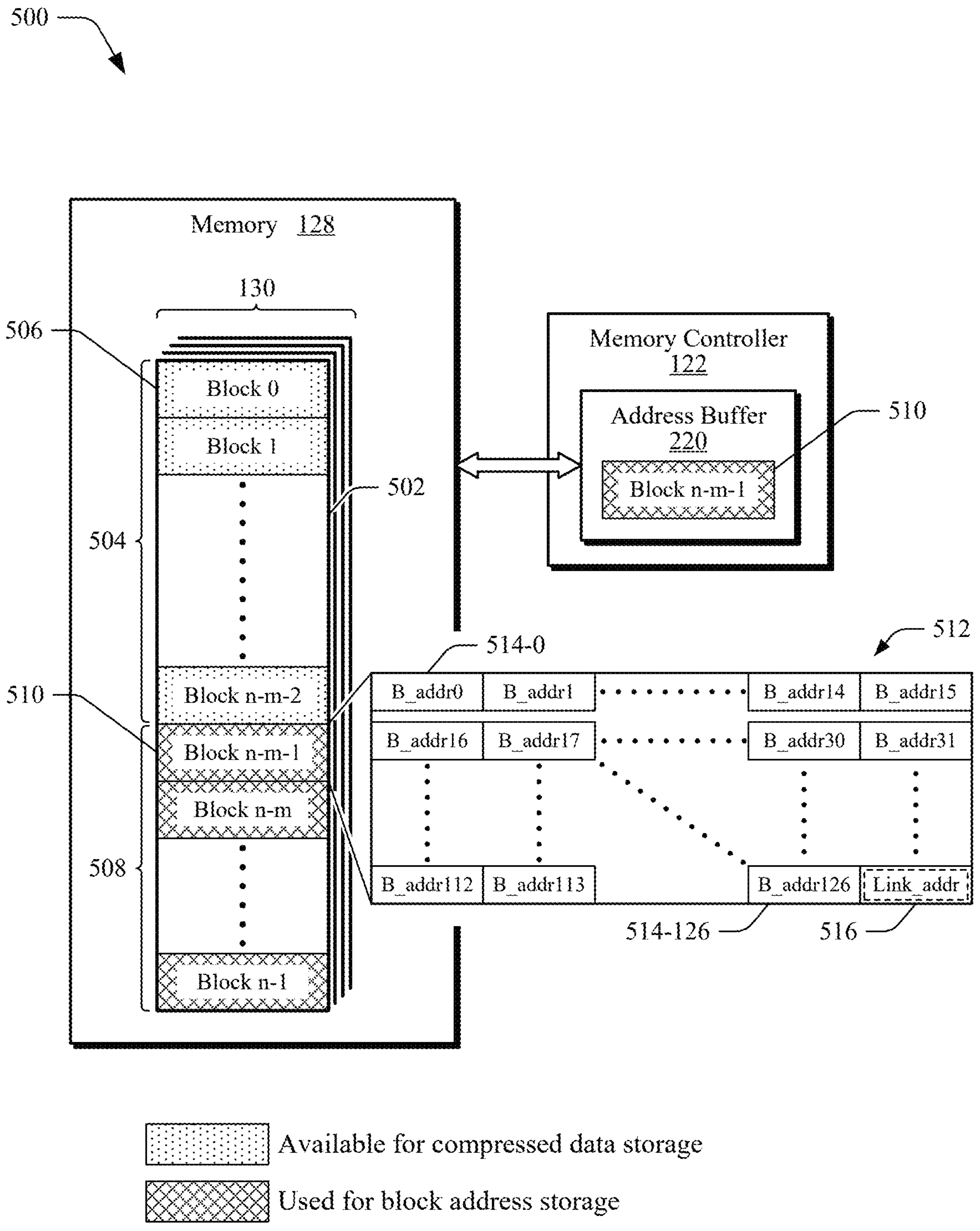
FIG. 5 illustrates an example memory with address storage blocks implemented in accordance with one or more aspects.

FIG. 5 illustrates at 500 an example memory configured in accordance with one or more aspects of free block address management. The example memory may include a memory 128 (e.g., external memory) coupled with the memory system 114 as described with reference to FIGS. 1-3 or an integrated circuit of FIG. 14. Prior to configuration, a memory controller 122 may initialize the memory 128, query the memory to obtain configuration information (e.g., size, format, organization, protocol capabilities) of the memory, or erase existing contents of the memory. In this example, a memory 128 is illustrated as multiple instances of DRAM 130 (e.g., memory dies, memory arrays), which may be configured similarly or differently from one another. Generally, the example aspects of memory configuration described with reference to FIG. 5 may be scaled over any size of memory, which may include a memory array of a DRAM die, multiple DRAM dies, a DRAM module, multiple DRAM modules, and so forth. Although described in the context of DRAM, the described aspects may be applied to any other type of memory (e.g., flash memory), examples of which are described herein.

In this example, an area 502 of DRAM 130 includes a first partition 504 (e.g., allocation, section) of blocks 506 (free blocks) allocated for storing compressed data and a second partition 508 (e.g., allocation, section) of block 510 allocated for storing addresses (address storage blocks). In aspects, the address manager 124 may select or determine the area 502 and then divide the area 502 into the blocks for storing compressed data, uncompressed data, and/or addresses. In some implementations, the address manager 124 configures respective sizes of the partitions or respective numbers of the blocks such that enough address storage blocks are formed or claimed to store, as the linked list, the addresses of the remaining blocks available for data storage (e.g., initial free blocks of memory). Thus, based on a size of block address entries (e.g., address bit length) and a size of the blocks (memory line length, number of rows), the address manager 124 can configure m number of address storage blocks to track or maintain addresses for n-m blocks free for data storage in the area 502 or module of DRAM 130. As shown in FIG. 5, the address manager 124 can configure the memory area 502 of n blocks with a first partition 504 of n-m blocks 506 (block 0 to block n-m−2) for compressed data storage a second partition 508 of m blocks (block n-m−1 to block n−1) as address storage blocks 510. Although shown as a "bottom-up" implementation, the address manager 124 may build the link list of address storage blocks from the top of the memory area 502 and store compressed data starting at an end or bottom address of the memory area.

A detailed example address storage block 510 is illustrated at 512, where an address storage block (in an address buffer or in memory) is configured with block addresses and a linked block address in accordance with one or more aspects. Generally, the address storage blocks 510, 512 may be configured with any suitable size, geometry, number of block address entries, or the like. In this example, the address storage block 512 is configured such that the address storage block can store 16 block addresses per row (e.g., 16 32-bit block addresses), with eight rows of memory or cache lines available in each block. In various aspects, the address manager 124 may load or pop an address storage block 510, 512 from the linked list in the memory 128 to the address buffer 220 or an address cache of the memory controller 122. This may allow the memory controller 122 to obtain addresses of free blocks, which can be used to write data to the memory. The address manager 124 may also store addresses of free blocks in the address buffer 220 (e.g., forming an address storage block) and then push those addresses along with a link address to a block in the memory to add another address storage block to the linked list of free blocks. For example, as shown in FIG. 5, the address manager 124 has collected 127 block addresses, block address 0 514-0 through block address 126 514-126, and a link address 516 to a next address storage block in the linked list 132 of free block addresses. In aspects, the 127 addresses may correspond to any set of 127 free blocks (e.g., contiguous or non-contiguous free blocks) within the memory section of block 0 to block n-m−2 and the link address may correspond to another address storage block, such as one adjacent to the block 512. In this example, the address manager 124 populates the address storage block 512 with addresses for 127 contiguous free blocks of the first partition 504 of the free blocks 506. As described herein, when the addresses of an address storage block 510, 512 are used up for compressed data write operations, the address manager 124 can release the address storage block of stale addresses (e.g., used for write operations) to the free block linked list, enabling the former address storge block to be used by the host to store data. Alternatively, the address manager 124 can release an address storage block responsive to loading the address storage block to the address buffer 220, enabling the block to be repurposed for data storage. Thus, when the address blocks of the free block linked list are consumed completely (e.g., memory reaches full occupancy), none of the memory is used to maintain the free block linked list such that the described aspects incur zero capacity overhead.

Various techniques of free block address management for compressed data storage are described with reference to FIGS. 6-13. These techniques may be implemented using any of the environments and entities described herein, such as the memory controller 122, address manager 124, address buffer 220, address algorithms 312, CSRs 314, and/or address storage blocks. The techniques include various methods depicted in FIGS. 6, 7, 8, 10, 12, and 13, which includes operations that may be performed by one or more entities of a memory system (e.g., external memory). In some implementations the entities (e.g., address manager) of FIGS. 1-5 and/or the integrated circuit of FIG. 14 may provide means for implementing the operations described with reference to the described methods. In some aspects, the entities or actors described herein, such as the memory controller 122 or address manager 124, may be implemented by a processor that is configured to execute instructions or code stored in a hardware-based memory to implement the corresponding function(s) performed by the actor. The example methods 600, 700, 800, 1000, 1200, and 1300 are depicted as sets of operations (or acts) performed but not necessarily limited to the order or combinations in which the operations are shown herein. Further, any of the operations may be repeated, combined, omitted, reorganized, or linked to implement various aspects described herein. In portions of the following discussion, reference may be made to the operating environment 100 of FIG. 1, various entities, configurations, or components of FIGS. 2-5, or the integrated circuit of FIG. 14, reference to which is made for example only. The described techniques are not limited to performance by one entity, or multiple entities operating on one device and may be implemented by shared or distributed components or functions.

Figure 6:
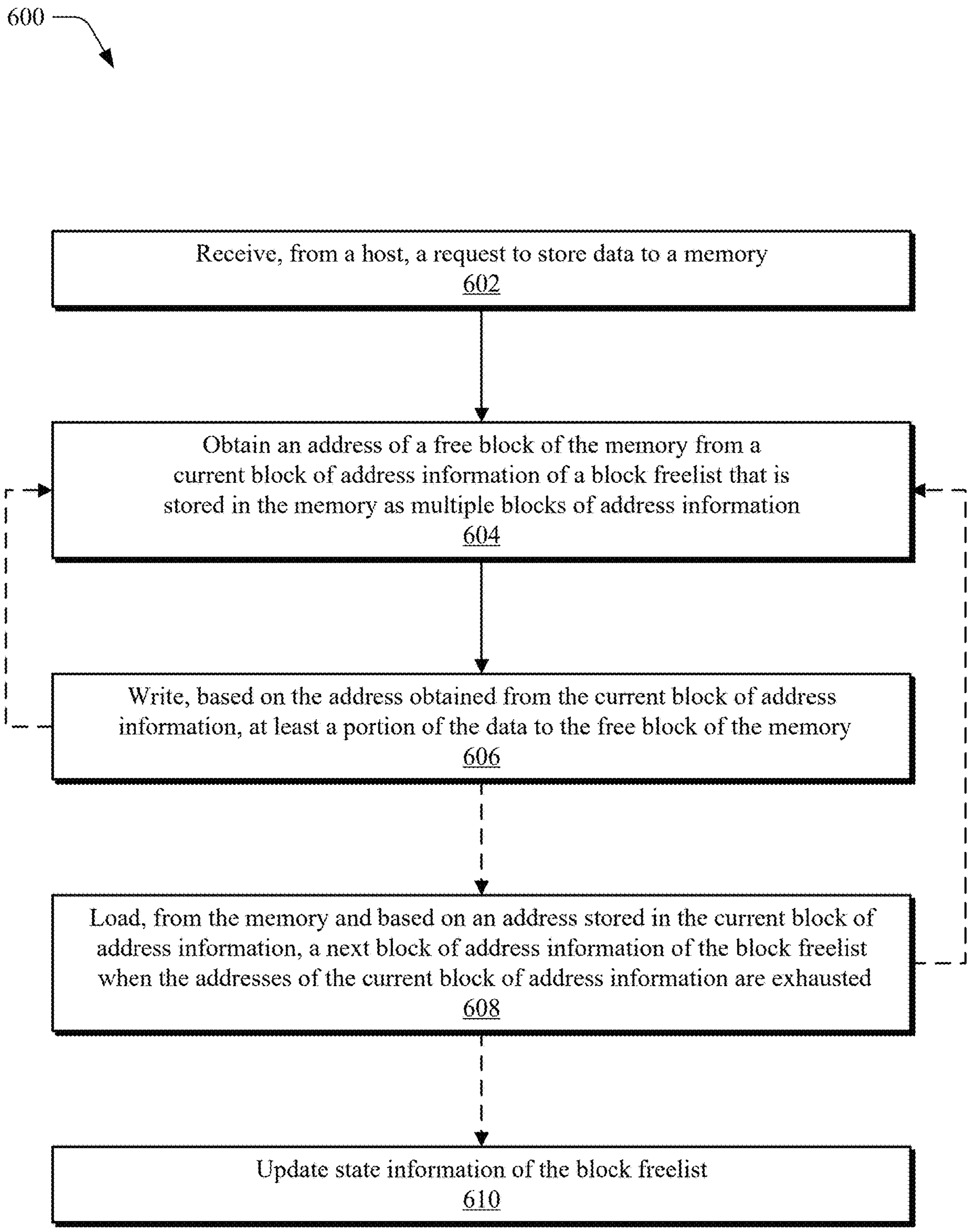
FIG. 6 depicts an example method for writing compressed data to a free block of memory in accordance with one or more aspects of free block address management.

FIG. 6 depicts an example method 600 for writing compressed data to a free block of memory in accordance with one or more aspects. For example, the address manager may provide addresses of free blocks in memory to a memory controller for writing compressed data of a host to the memory.

At 602, a memory controller receives, from a host, a request to store data to a memory (e.g., external memory). The host can send the memory controller any suitable amount of data, which may include a cache line or page of uncompressed data. In some cases, the request includes a CXL command to store the data to the memory coupled to the storage controller. The memory may be configured into blocks for storing data, with the blocks being of configurable size. In some cases, the memory controller configures the memory or an area of the memory into blocks of a specified size based on a block-sizing parameter of the memory controller. In aspects, the memory may include or be initially configured with a section of free blocks available for storing data and a section of blocks storing addresses of the free blocks of the memory. The blocks of free block addresses, or blocks of address information, may be implemented as a block freelist of linked blocks stored in the memory.

At 604, an address manager obtains an address of a free block of the memory from a current block of address information of the block freelist. As described herein, the block freelist may be stored in the memory as multiple linked blocks of address information or address storage blocks. Thus, the blocks of address information can be organized as a sequence of address storage blocks in the memory that store the addresses of the free blocks of the same memory. Each of the address storage blocks may store multiple free block addresses and an address to a next address storage block in the sequence to implement the block freelist as a linked list (e.g., free block linked list) of the addresses of free blocks in the memory. In some cases, the address manager loads, from the memory, the block of address information to a storage element (e.g., address buffer, address cache) of the memory controller as the current block of address information. After loading the block of address information to the storage element, the address manager may release the block of address information maintained in the memory to the block freelist. Alternatively, the address manager can release the block of address information when the free block addresses of the block are exhausted or consumed.

At 606, the memory controller writes, based on the address obtained from the current block of address information, at least a portion of the data to the free block of the memory. In some implementations, the memory controller compresses the data to provide compressed data, which the memory controller then writes to the free block of memory. In some cases, the amount of the data or compressed data is equal to or less than a size of the free block, and the memory controller can complete the write operation by storing the data to one free block. In such cases, the method 600 may proceed to operation 610 to update state information of the block freelist and/or return to operation 602 to wait for a next access of the memory. When the amount of the data or compressed data exceeds the size of the free block, the method 600 may return to operation 604 to obtain an address of a next free block to write a next portion of the data to the next free block in the memory. As described herein, the address of the next free block may be contiguous with the previously written block or a non-contiguous block of the memory. Thus, the method 600 may repeat operations 604 and/or 606 to write the data or compressed data to multiple free blocks of the memory using addresses obtained from the block of address information. When the addresses of the block of address information or address storage block are exhausted, the method 600 can proceed to operation 608 to load a next block of address information from the block freelist in the memory. In some cases, the address manager releases the current block of address information in the memory after the free block addresses are exhausted.

Optionally at 608, the address manager loads, from the memory and based on an address stored in the current block of address information, a next block of address information of the block freelist. The next block of address information may be loaded to the storage element of the memory controller when the addresses of the current block of address information are exhausted. In some cases, the next block of address information is loaded using an address block pointer (block link head pointer) of the block freelist that is set or configured based on a link address (e.g., link address 516) stored in the current (or previous) block of address information. When an address block pointer is used to track the current block of address information, the address manager can update the address block pointer to an address of a subsequent block of address information based on a link address obtained from the next block of address information after being loaded from the memory. From operation 608, the method 600 can return to operations 604 and 606 to write additional data or compressed data to multiple free blocks of the memory using addresses obtained from the next (now current) block of address information.

Optionally at 610, the address manager updates state information of the block freelist maintained by the address manager. The address manager may update state information or a status of the block freelist to reflect a number of the free blocks available, a number of free block addresses stored by the block freelist, a number of address storage blocks in the block freelist, a number of link addresses in the block freelist, or the like. For example, based on a number of free block addresses and blocks of address information used to write data to the memory, the address manager can update a freelist block count for tracking the number of free blocks in the block freelist, a block link count for tracking the number of linked address storage blocks in the freelist, and/or a block link head pointer (e.g., for the address buffer 220 and/or the linked list 132 in memory) for tracking the current or next block of address information.

Figure 7:
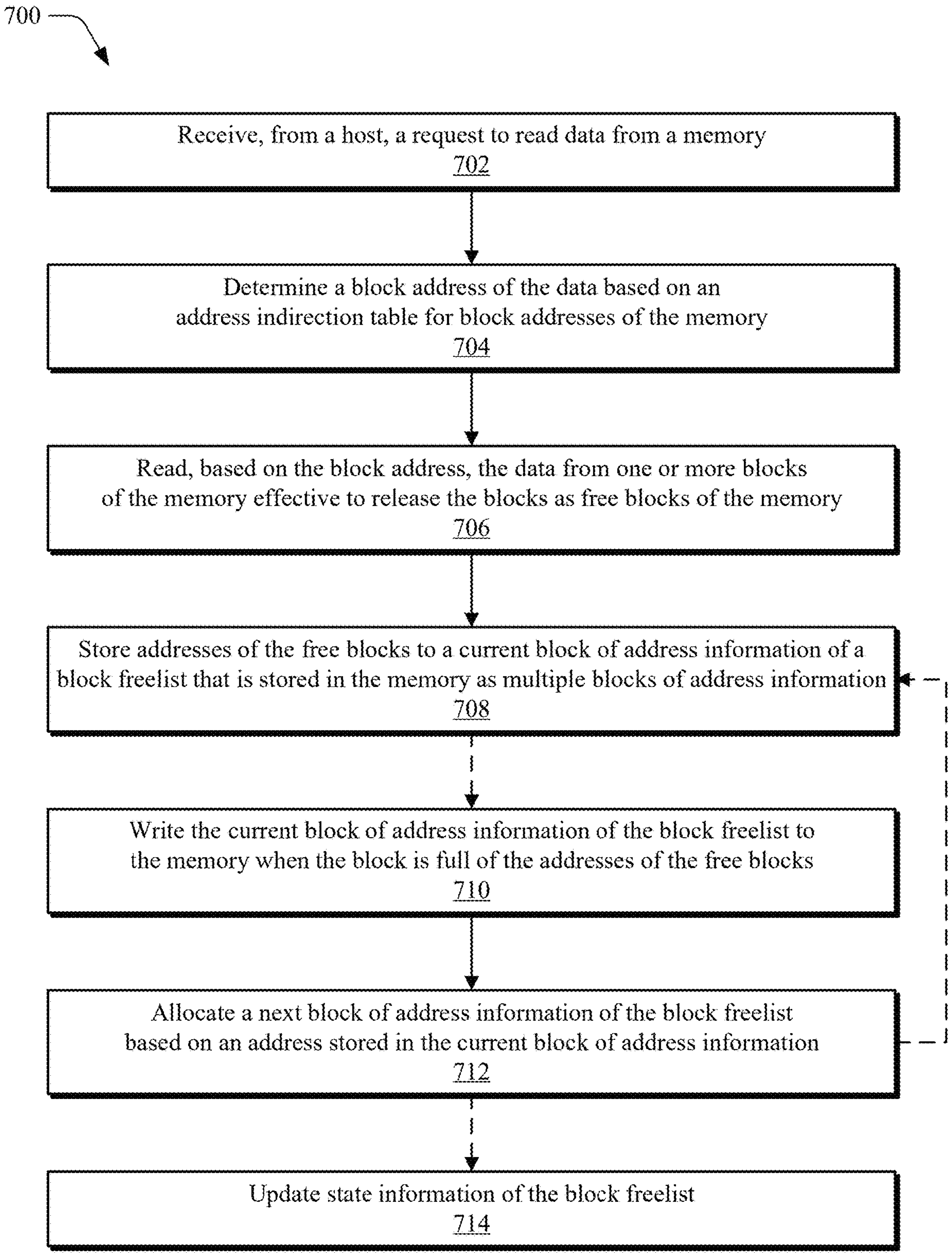
FIG. 7 depicts an example method for reading data from a block of memory in accordance with one or more aspects of free block address management.

FIG. 7 depicts an example method 700 for reading compressed data from a block of memory in accordance with one or more aspects. For example, the address manager may collect addresses of free blocks released when the memory controller reads compressed data from blocks of memory.

At 702, a memory controller receives, from a host, a request to read data from a memory (e.g., external memory). The request may include a page address or cache line address for the data in relation to the address space of the host. For example, the host may request that the memory controller read, based on a page address, the page of data from the memory. In some cases, the request is configured as a CXL command to load the data from the memory coupled to the storage controller.

At 704, the memory controller determines a block address of the data based on an address indirection table for block addresses of the memory. In various aspects, the memory controller configures the memory or an area of the memory into blocks for storing data, with the blocks having an address space that is different from that of the host. The memory controller may use the address indirection table to translate the page address or cache line address provided by the host to a block address at which the data is stored in a memory system. Based on the address information provided with the request, the memory controller may determine a block address, a block address range, and/or a number of blocks from which to read the data.

At 706, the memory controller reads, based on the block address, the data from one or more blocks of the memory. This may be effective to release the blocks as free blocks of the memory after the data is read from the blocks. The memory controller can then transfer the data read from the blocks of the memory to the host, completing the request for data. In some cases, the data is stored as compressed data in the blocks of the memory to increase effective storage capacity of the memory. For example, a page of host data may be compressed to a smaller amount of data, which is then stored to one or more blocks of the memory. When the memory controller reads the compressed data from blocks of the memory, the memory controller can decompress the data and return the uncompressed data (e.g., page of data) to the host. After data is read from a block of the memory, the memory controller or address manager may release or free the block, which can be used to store other data.

At 708, an address manager stores the addresses of the free blocks to a current block of address information of a block freelist. The block freelist may be stored in the memory as multiple blocks of address information or address storage blocks. The current block of address information may be maintained in an address buffer or address cache of the memory controller. For example, as the memory controller releases blocks of the memory responsive to read operations, the address manager may collect the addresses of the free blocks in the address buffer. In other words, the current block of address information may be maintained and/or updated in the address buffer, while the multiple blocks of address information of the block freelist are maintained in the memory. In aspects, the address manager may insert, as a link to a next block of address information, an address of a free block of the memory. For the next linked block of the block freelist, the address manager may select one of the free blocks released during a read operation or any other free block in the memory. In some implementations, the address manager may be configured to select and link an address of a first available free block, which can be inserted at a first address location or a last address location in the block of address information. If the number of the free block addresses stored to the current block of address information do not fill the block or address buffer, the method 700 may proceed to 714 to update state information of the block freelist.

Optionally at 710, the address manager writes the current block of address information of the block freelist to the memory when the block is full of addresses. Alternatively, the address manager may write one or more addresses in the current block of addresses to a corresponding block of address information in the memory, such as to maintain coherency between an address cache of the memory controller and the block freelist stored in the memory. The address manager may write the block addresses of the current block of address information to the block of memory based on a block address pushed from a block read by the memory controller (e.g., first block read from a full memory) or a link address from a preceding block in the sequence of linked address storage blocks. Alternatively or additionally, the address manager may implement a pointer to track the current block of address information, which may be updated based on link addresses of address storage blocks that are popped from or pushed to the linked blocks of the block freelist stored in the memory.

Optionally at 712, the address manager allocates a next block of address information of the block freelist based on an address stored in the current block of address information. The allocation of the next block of address information may include pushing an address of a free block claimed for address storage based on the link address stored (e.g., first or last address slot) in the current block of address information that was written to the memory. The address manager may set the address buffer or address cache of the memory controller to build the next block of address information, such that the addresses of free blocks collected in the buffer will be written (e.g., when the address buffer holds enough addresses to fill a block) to the next block of address information (e.g., address pushed from the linked list) in the block freelist. From the operation 712, the method 700 may return to operation 708 to collect additional addresses of free blocks to be added to the block freelist or proceed to operation 714 to update state information of the block freelist.

Optionally at 714, the address manager updates state information of the block freelist. The address manager may update state information or a status of the block freelist to reflect the number of the free blocks available, the number of free block addresses stored by the block freelist, the number of address storage blocks in the block freelist, the number of link addresses in the block freelist, or the like. For example, based on a number of free block addresses collected and blocks of address information written to memory following the reads of data from the memory, the address manager can update the freelist block count for tracking the number of free blocks in the block freelist, the block link count for tracking the number of linked address storage blocks in the freelist, and/or the address block pointer (e.g., for the address buffer 220 and/or the linked list 132 in memory) for tracking the head block of the address information.

Figure 8:
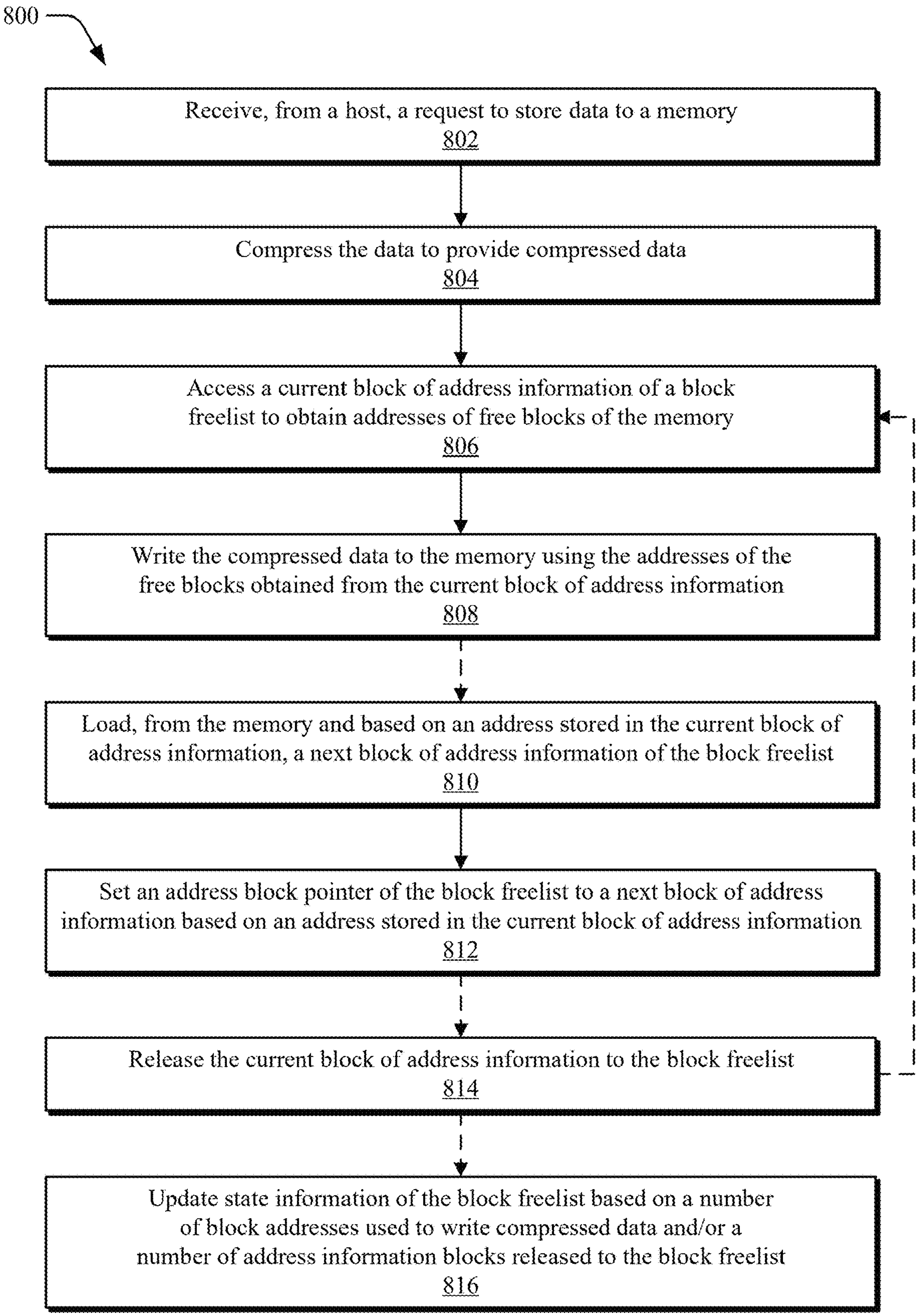
FIG. 8 depicts an example method for using addresses of a block of address information to write compressed data to free blocks of memory in accordance with one or more aspects.

FIG. 8 depicts an example method 800 for using addresses of a block of address information to write compressed data to free blocks of memory in accordance with one or more aspects.

At 802, a memory controller receives, from a host, a request to store data to a memory (e.g., external memory). The host can send the memory controller any suitable amount of data, which may include a cache line, multiple cache lines, or a page of uncompressed data. In some cases, the request includes a CXL command to store the data to the memory coupled to the storage controller. The memory may include a first section of free blocks and a second section of blocks of address information for the free blocks. In aspects, the memory controller may divide the memory into configurable-sized blocks, which are suitable for storing data of the host and blocks of address information. By way of example, consider FIG. 9 which illustrates at 900 an example memory area 502 that a memory controller has divided into blocks 506, which can be used to store data (e.g., compressed data) or address storage blocks 510 (e.g., blocks of address information). The initial configuration of the memory at 901 may be similar to the memory implementation 500 described with reference to FIG. 5.

The address manager may initialize or establish a block freelist of linked address storage blocks in the memory in any suitable fashion, which may include allocating or claiming a number of address storage blocks to manage the addresses of all other blocks in the memory area. In the context of the present example, assume the memory area 502 has an available capacity of 512 Megabytes and the address manager configures a size of the blocks 506, 510 as 512 bytes resulting in one million blocks (1M blocks). Given the address space of the memory area 502, each block can store 16 block addresses across each cache line and the block includes eight rows of cache lines for a total storage capacity of 128 addresses per block. The address manager determines that eight thousand block (8K blocks) are needed to store the addresses of the 1M blocks, and the address manager claims 8K free blocks to form the block list for the 1M blocks. The address manager then builds out the linked address storage blocks to store the addresses of the remaining free blocks from the 1M blocks. In this example, the address manager may also implement a freelist block counter for tracking the number of free blocks (1M-8K) in the block freelist and a block link counter for tracking the number of linked address storage blocks (8K) in the freelist.

At 804, the memory controller compresses the data to provide compressed data. For example, the memory controller can use a compression engine or compression block to compress a page of data received from the host to provide a smaller amount of compressed data that is suitable to write to one or more of the blocks of the memory.

At 806, an address manager accesses a current block of address information of a block freelist to obtain addresses of free blocks of the memory. The address manager may access a current block of address information that is stored in an address buffer or address cache of the memory controller. The current block of address information may be loaded into the address buffer or address cache based on an address block pointer of the block freelist or a link address of a previously accessed block of address information. Continuing the example of FIG. 9 and assuming that an address storage block 510 has not yet been loaded into an on-chip buffer (e.g., address buffer 220) of the memory controller 122, the address manager 124 loads (e.g., directs the memory controller to load) a first address storage block 510-1 from the memory into the on-chip buffer based on an address block pointer. The address manager 124 can then access the address storage block 510-1 to obtain one or more addresses of free blocks 506 in the memory.

At 808, the memory controller writes the compressed data to the memory using the addresses of the free blocks obtained from the current block of address information. For example, the memory controller may write, based on the address obtained from the address storage block, compressed data to one or more blocks of the memory that are available for data storage. The memory controller may continue writing data to free blocks of the memory until the addresses of the current block of address information are exhausted. In the context of the present example, the memory controller writes the compressed data of the host to 127 of the free blocks 506 of the memory based on the addresses provided by the address manager from the address storage block 510-1. From operation 808, the method 800 may optionally proceed to operation 816 to update state information of the block freelist after the write operation is complete and/or to operation 810 to load a next block of address information from the memory. With the consumption of the 127 address of free blocks to write the compressed data to the memory, the address manager can decrease the number of free blocks (e.g., freelist block count) in the block freelist by 127.

Optionally at 810, the address manager loads, from memory and based on an address stored in the current block of address information, a next block of address information. The address manager may use an address block pointer that was set to the address of the next block of address information, such as when the current block of address information was loaded into the address buffer or when the address manager encountered the link address for the next block in one of the slots of the current block (e.g., first address location or last address location). In some implementations, the next block of address information is released in the memory after the next block has been popped or loaded from the linked list in memory to the on-chip buffer of the memory controller. Continuing the present example, the address manager loads address storage block n-m based on the link address from the current address storage block 510-1. Here, assume that the address manager previously set the address block pointer of the block freelist to the link address of block n-m after the current address storage block 510-1 was loaded into the on-chip buffer.

At 812, the address manager sets an address block pointer of the block freelist to a next block of address information based on an address stored in the current block of address information. For example, the address manager may encounter a first address in the current block of address information as a link address to the next block of address information in the block freelist and use that link address to set the block pointer. Alternatively, the address manager may be configured to use a last address of the current address information block as the link address to set the address block pointer to the next block of address information. In the context of the present example, the address manager sets the address block pointer to the link address in the current address storage block n-m to the address of the next storage block n-m+1 (not shown in FIG. 9).

At 814, the address manager releases the current block of address information to the block freelist. The address manager may release the current block of address information after the free block addresses of the current block have been exhausted. Alternatively, as described herein, the address manager can release the current block of address information in the memory after the current block is loaded or copied into a storage element (e.g., address buffer or address cache) of the memory controller. When the address manager releases a block of address information as a free block to the block freelist, the address manager may update a freelist block count to reflect the addition of another free block. Continuing the ongoing example at 903, assuming all address of address storage block n-m−1 have been exhausted, the address manager can release the block n-m−1 as a free block 506-1, adding another free block in the section previously occupied by address storage blocks. The address manager may also increase the count of the number of free blocks in the block freelist (e.g., freelist block count) by 1. From operation 814, or any preceding operation (e.g., 810, 812), the method 800 may return to operation 806 to obtain additional addresses of free blocks from a current block of address information to write more compressed data to the memory. Thus, as the memory controller writes the compressed data to blocks available for compressed data storage, the address manager can advance (e.g., operations 806-814) through and release the linked address storage blocks of the block freelist stored in memory.

Figure 9:
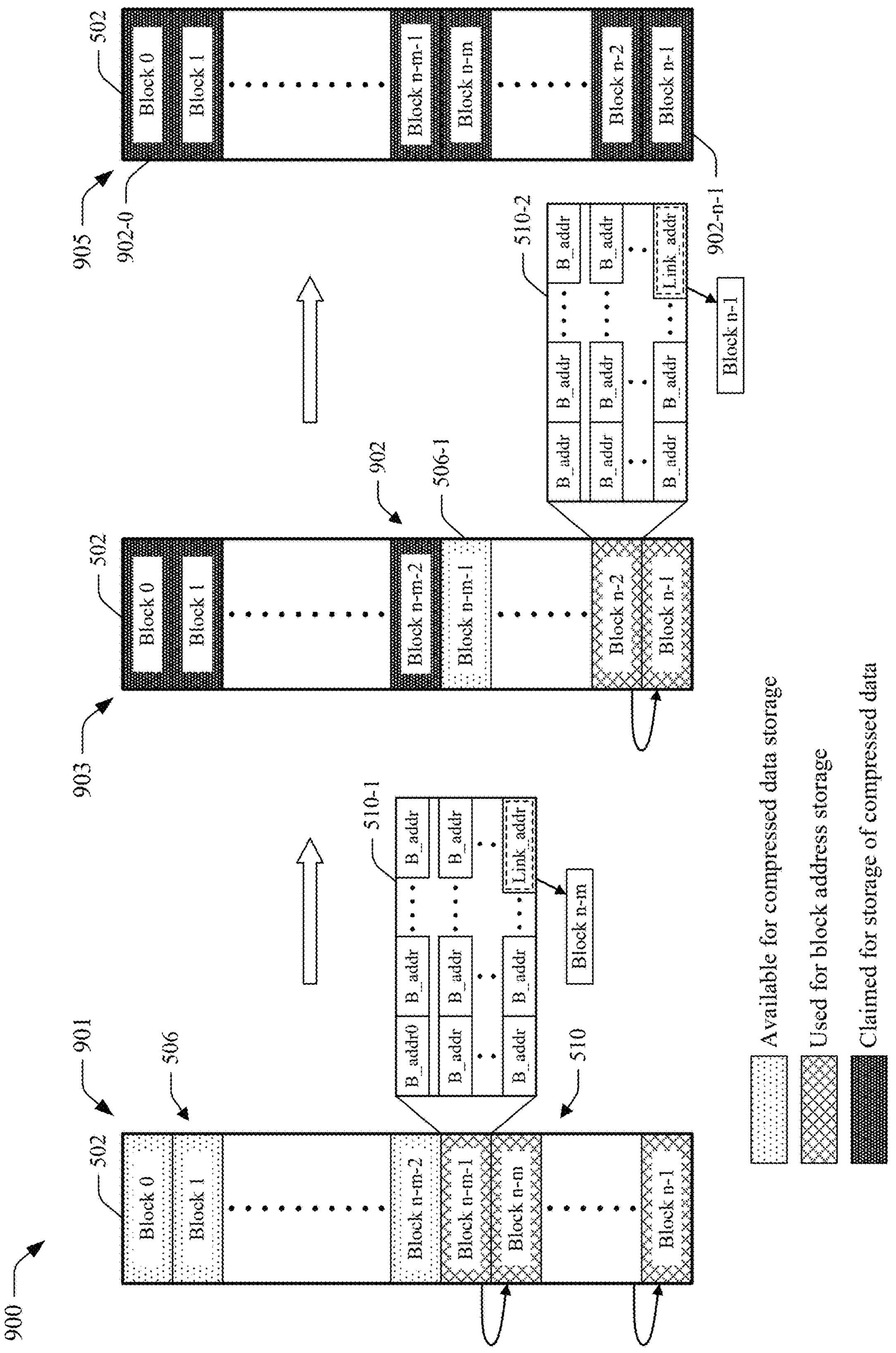
FIG. 9 illustrates an example memory in which blocks of address information are released to a block freelist as a memory controller uses the address information to write compressed data.

Concluding the example of FIG. 9, with additional writes of compressed data to the free blocks 506, the memory controller can claim the blocks 902 of the memory for compressed data storage at 903 and begin writing compressed data to free blocks (e.g., 506-1) that were released by the address manager. As the addresses of the block freelist are consumed to write compressed data to the free blocks, the address manager can advance through the linked address storage blocks toward the second to last address storage block 510-2. When address storage block 510-2 is the current address storage block, the address manager can update the address block pointer to the link address (block n−1) and use the addresses of those two blocks to write compressed data to the remaining free blocks in the memory. As shown at 905, when the memory controller has used all of the free block addresses in the block freelist (e.g., memory reaches full occupancy), all of blocks 902-0 through **902-*n*−1 for compressed data storage, and none of the memory area 502** is used to maintain the block freelist (zero capacity overhead). Thus, the block initially claimed for address storage to create the linked list of free block addresses are released back to the freelist for storing data and compressed data can be written to all 1M blocks.

Optionally at 816, the address manager updates state information of the block freelist based on a number of block addresses used to write compressed data and/or a number of address storage blocks released to the freelist. As described with reference to individual operations of the method 800, the address manager may update the state information to reflect changes in the status of the block freelist at each operation by the address manager or memory controller. Alternatively, the address manager can update the state information after a number of free block addresses of the block freelist have been used to write compressed data to the memory. For example, based on a number of free block addresses and blocks of address information used to write the compressed data to the memory, the address manager can update the freelist block count for tracking the number of free blocks in the block freelist (1M), the block link count for tracking the number of linked address storage blocks in the freelist (0), and/or a block link head pointer (e.g., for the address buffer 220 and/or the linked list 132 in memory) for tracking the current block of address information.

Figure 10:
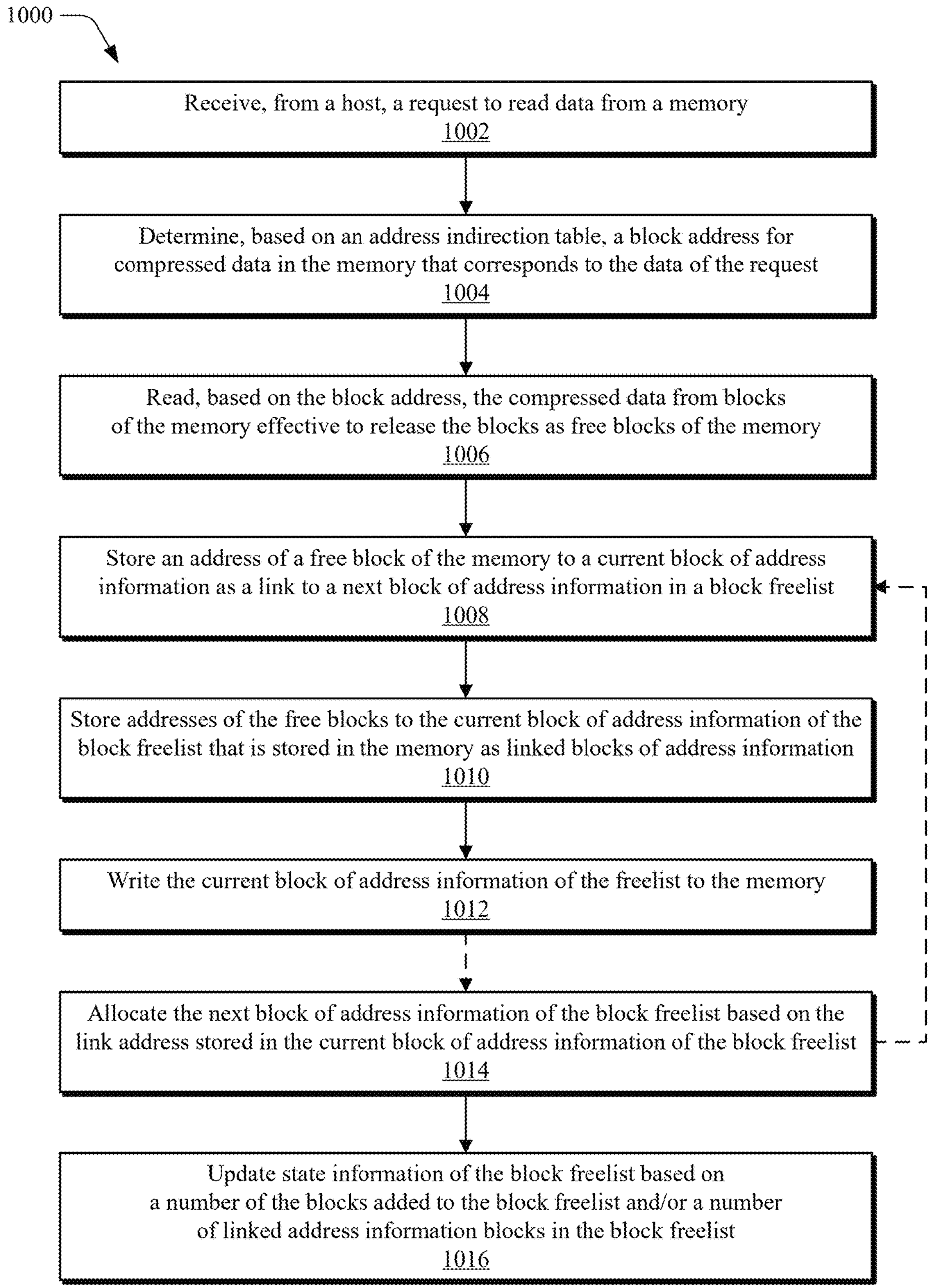
FIG. 10 depicts an example method for storing addresses of free blocks to a block of address information as a memory controller reads compressed data from the memory.

FIG. 10 depicts an example method 1000 for storing addresses of free blocks to a block of address information as a memory controller reads compressed data from the memory.

At 1002, a memory controller receives, from a host, a request to read data from a memory (e.g., external memory).

The request may include a page address or cache line address for the data in relation to the address space of the host. For example, the host may request that the memory controller read, based on a page address, the page of data stored in the memory. In some cases, the request is configured as a CXL command to load the data from the memory and provide the data to the host via a CXL interconnect. To increase the effective capacity of the memory, the memory controller can compress the data of the host and store the compressed data to blocks of the memory, which may have a different address space from that of the host.

Figure 11:
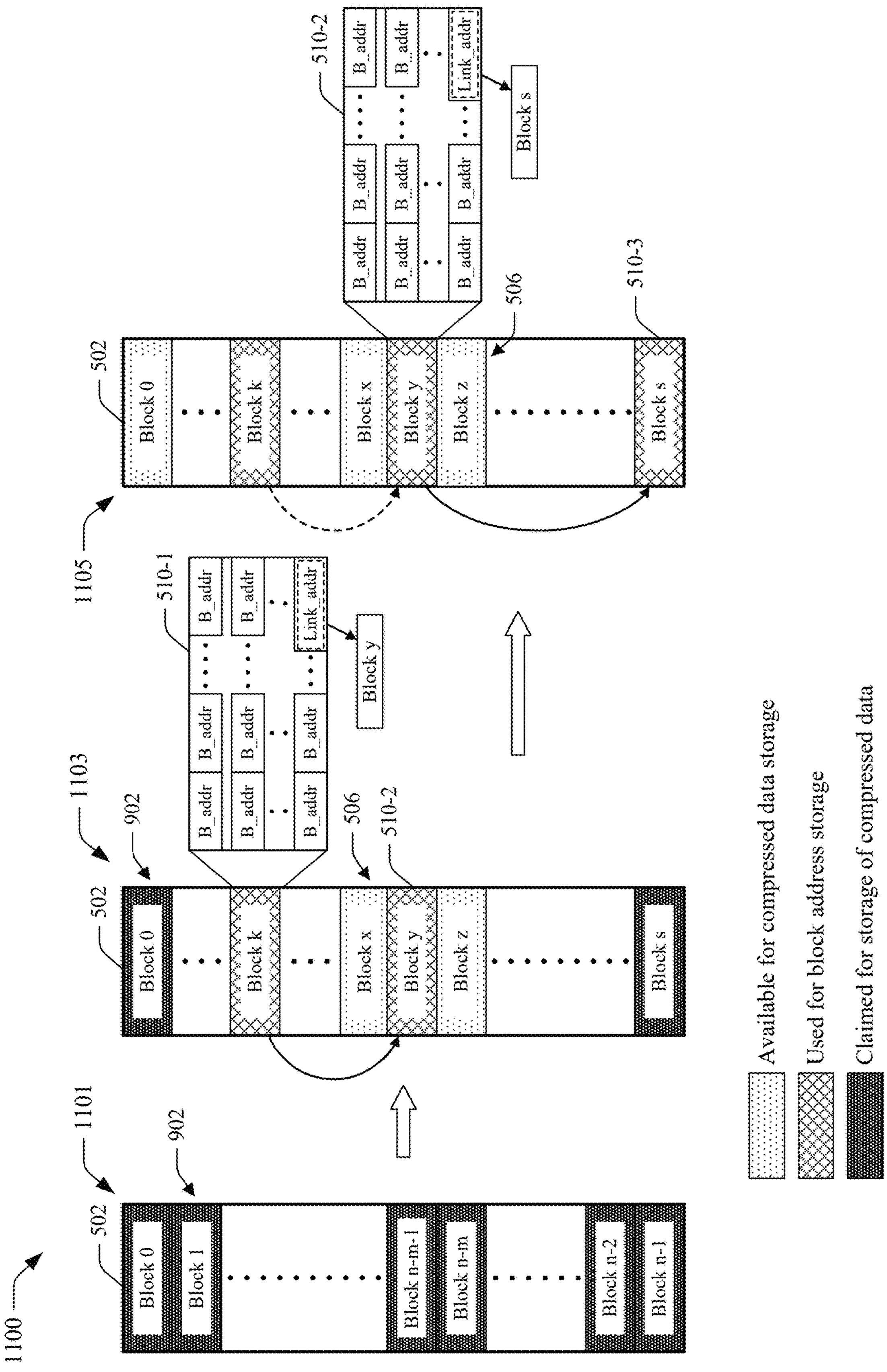
FIG. 11 illustrates an example memory in which blocks of address information are populated and linked to form a block freelist in the memory.

By way of example, consider FIG. 11 which illustrates at 1100 a memory that the memory controller has divided into blocks for storing data (e.g., compressed data or address information). The example memory of FIG. 11 may be configured similarly to the memory as described with reference to FIG. 8 and/or FIG. 5, and the same numbers may reference like elements. As shown at 1101, the blocks 902 of the memory area 502, block 0 through block n−1, store compressed data and there are no free blocks of memory available. In accordance with aspects of free block address management, when the memory is fully occupied by data, an address manager of the memory controller incurs no overhead to manage a block freelist. In the context of operation 1002, the memory controller 122 receives a request from a host device 110 to read a page of data, which is stored as compressed data in one or more blocks 902 of the memory area 502.

At 1004, the memory controller determines, based on an address indirection table, a block address for the compressed data in the memory that corresponds to the data of the request. The memory controller may use the address indirection table to translate the page address or cache line address provided by the host to a block address at which the compressed data is stored in the memory. Based on the address information provided with the request (e.g., page address, amount of data), the memory controller may determine a block address, a block address range, and/or a number of blocks from which to read the compressed data. In the context of the present example, the memory controller accesses the address indirection table based on the page address of the request and determines that block k through block z of the memory store compressed data that corresponds to the page of data requested.

At 1006, the memory controller reads, based on the block address, the compressed data from blocks of the memory effective to release the blocks as free blocks of the memory. The memory controller can decompress the data read from the blocks and then transfer the uncompressed data to the host, completing the request for data. After data is read from a block of the memory, the memory controller or address manager may release or free the block for storing other data. Continuing the ongoing example, at 1103, the memory controller reads compressed data from blocks k through z, which are then released as free blocks of memory for storing data.

At 1008, the address manager stores an address of a free block of the memory to a current block of address information as a link to a next block of address information in a block freelist. Without a current block of address information, such as when reading from a full memory, the address manager may select and use any available free block as the current block of address information. For example, the address manager may be configured to use a first available block of the memory as the current block of address information. The address manager can select any available block of memory as the next linked block of address information in the block freelist. For example, the address manager may use the second available block released from a read operation (e.g., when the first block is selected as the current block) or select any available block in the memory to link as the next block of address information. Thus, a next linked address storage block may not be contiguous with the current address storage block, such that the linked list of address storage blocks may include contiguous and/or non-contiguous address storage blocks. In some implementations, the address manager may select the next and/or subsequent blocks of address information from free blocks that are adjacent to other blocks of address information. This may be effective to build or generate the block freelist in the memory as a partition or section of address storage blocks and leaving other areas of contiguous blocks available for storing data. In the context of the present example, the address manager selects block k as a head block of address information (e.g., first address storage block 510-1) of the block freelist and stores an address of block y (e.g., a non-contiguous block) as a link address effective to claim block y as a second block of address information (second address storage block 510-2) in the block freelist. The other blocks 506 of the memory, such as block x and block z, are not claimed as address storage blocks and may remain available as free blocks for storing data.

At 1010, the address manager stores addresses of the free blocks to the current block of address information of the block freelist. The block freelist may be stored in the memory as linked blocks of address information or address storage blocks. As described herein, the current block of address information may be maintained in an address buffer or address cache of the memory controller. In other words, the current block of address information may be maintained and/or updated in the address buffer, while the multiple blocks of address information of the block freelist are maintained in the memory. As the memory controller releases blocks of the memory after data reads, the address manager can collect the addresses of the free blocks in the address buffer. Because data reads are host dependent and may not be sequential through the blocks of the memory, the blocks of memory released from data reads may not be contiguous. As such, the address manager may store, as a sequence of addresses in the block freelist, the addresses of contiguous and/or non-contiguous free blocks of the memory. Continuing the ongoing example, the address manager collects and stores the addresses of free blocks in the memory to an on-chip buffer of the memory controller that is associated with or pointed to block k in the memory (e.g., corresponding address storage block in memory). The free blocks for which the addresses are collected may include free blocks between block 0 and block k, free blocks between block k and block x, and/or free blocks between block z and block s, with block y having been claimed as the next address storage block.

At 1012, the memory controller writes the current block of address information of the freelist to the memory. The address manager may write the addresses of the current block of address information to the memory when the block has been filled with the addresses of the free blocks. Alternatively, the address manager may write one or more addresses in the current block of addresses to a corresponding block of address information in the memory, such as to maintain coherency between an address cache of the memory controller and the block freelist stored in the memory. The address manager may write the block addresses of the current block of address information to the block of memory based on a block address pushed from a block read by the memory controller (e.g., first read from a full memory) or a link address from a preceding block in the sequence of linked address storage blocks. In the context of the present example at 1103, the address manager writes the addresses of free blocks, including the link address to block y, from the on-chip buffer to block k in the memory.

At 1014, the address manager allocates the next block of address information of the block freelist based on the link address stored in the current block of address information of the block freelist. The allocation of the next block of address information may include pushing an address of a free block claimed for address storage based on the link address stored (e.g., first or last address slot) in the current block of address information that was written to the memory. The address manager may set the address buffer or address cache of the memory controller to build the next block of address information, such that the addresses of free blocks collected in the buffer will be written to the next block of address information (e.g., address pushed from the linked list) in the block freelist. From operation 1014, the method 1000 may return to operation 1008 to collect additional addresses of free blocks to be added to the block freelist or proceed to operation 1016 to update state information of the block freelist.

Continuing the ongoing example, the address manager pushes the link address of block y, setting block y as the current block of address information for which free block addresses can be collected. As shown at 1105, the address manager stores, to block y 510-2 (or the address buffer), the address of block s, the third address storage block 510-3, as a link address to the next block in the block freelist. The address manager may repeat operations of the method 1000 to collect addresses of other free blocks of the memory and write those addresses to block y. The operations of the method 1000 may be repeated until all of the compressed data has been read from the memory area 502 and the address manager has built the block freelist in the memory as the linked sequence of address storage blocks that stores the addresses of the free blocks in the memory.

Optionally at 1016, the address manager updates state information of the block freelist based on a number blocks added to the block freelist and/or a number of linked address information blocks in the block freelist. In aspects, the address manager may update state information or a status of the block freelist to reflect the number of the free blocks available, the number of free block addresses stored by the block freelist, the number of address storage blocks in the block freelist, the number of link addresses in the block freelist, or the like. Concluding the present example, the address manager updates a freelist block count with the number of free blocks in the memory (e.g., 1M-8K address storage blocks), updates a block link count with the number of linked blocks in the block freelist (e.g., 8K linked address storage blocks), and/or the address block pointer (e.g., for the address buffer 220 and/or the linked list 132 in memory) to the head of the linked list at block k.

Figure 12:
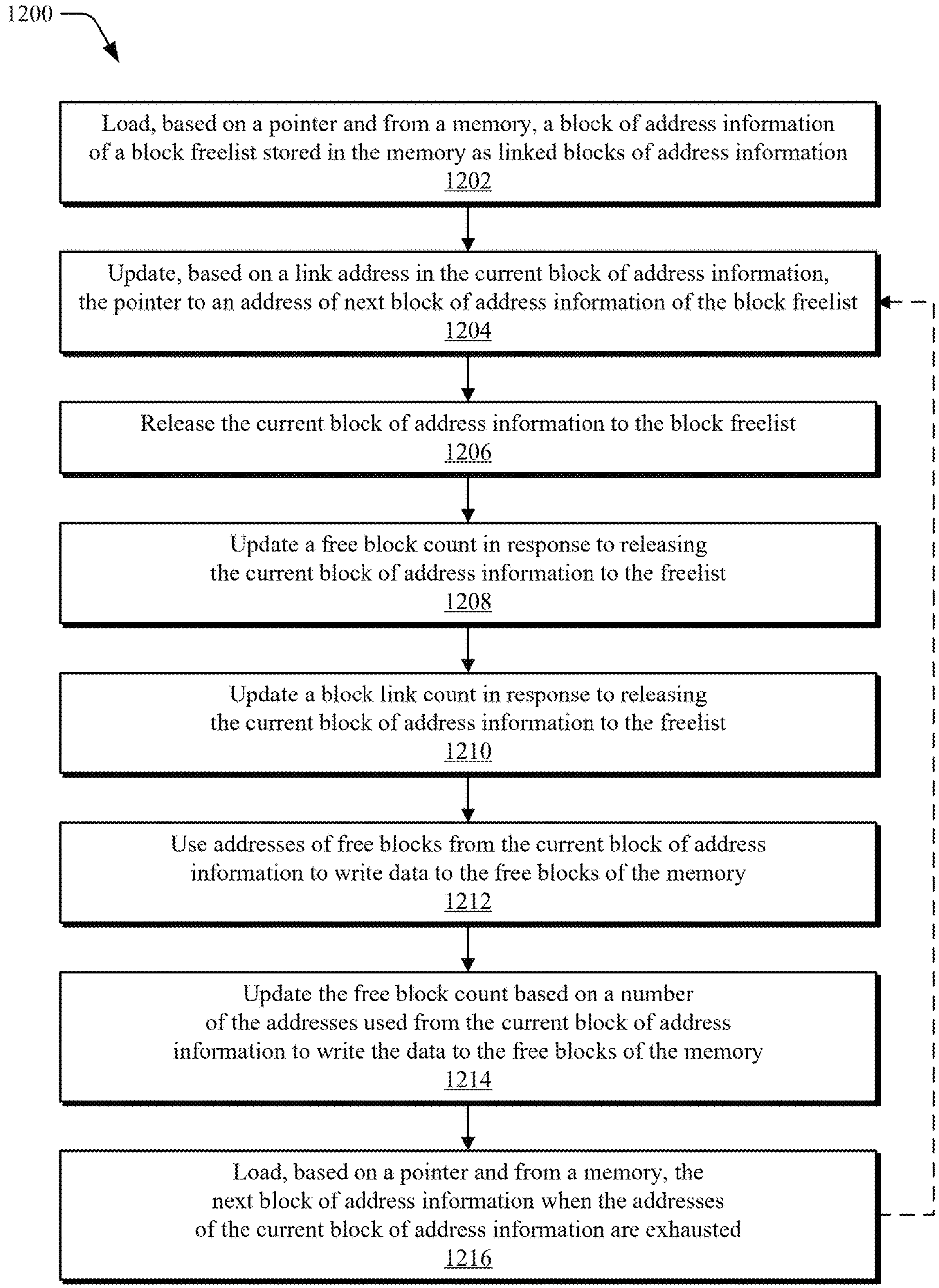
FIG. 12 depicts an example method for updating various state information of a linked list of address storage blocks as a memory controller writes data to a memory.

FIG. 12 depicts an example method 1200 for updating various state information of a linked list of address storage blocks as a memory controller writes data to a memory.

At 1202, an address manager loads, based on a pointer and from a memory, a block of address information of a block freelist. The block freelist may be stored in the memory (e.g., external memory) as multiple blocks of address information or address storage blocks. For example, the address manager may load or copy a head block of address information of the block freelist from the memory when starting to write data to the memory. At 1204, the address manager updates, based on a link address in the current block of address information, the pointer to an address of a next block of address information of the block freelist. The address manager may be configured to update the pointer using a first block address or a last block address in the current block of address information.

At 1206, the address manager releases the current block of address information to the block freelist. In some cases, the address manager is configured to release the current block of address information in the memory after the current block has been loaded, popped, or copied to a storage element of the memory controller. To do so, the address manager may add an address of the current block to the block freelist. Alternatively, the address manager may release the current block of address information after the free block addresses of the current block are exhausted. At 1208, the address manager updates a free block count in response to releasing the current block of address information to the block freelist. For example, the address manager can increment a free list block count in response the address manager releasing the current block of address information back to a free block pool of the memory.

At 1210, the address manager updates a block link count in response to releasing the current block of address information to the block freelist. The address manager may decrease the block link count to reflect that the block freelist includes one fewer blocks of address information after the current block is released. At 1212, the memory controller uses addresses of free blocks from the current block of address information to write data to the free blocks of the memory. As described with reference to method 600 and/or method 800, the address manager may provide the free block addresses to the memory controller for use in writing data to the blocks of the memory.

At 1214, the address manager updates the free block count based on a number of the addresses used from the current block of address information to write the data to the free blocks of the memory. The address manager may update the free block count based on using a portion of the addresses in the current block of address information or all of the addresses of the current block. At 1216, the address manager loads, based on the pointer and from the memory, the next block of address information when the addresses of the current block of address information are exhausted. In some implementations, the address manager may also release the current block of address information when the addresses of the current block are exhausted. From operation 1216, the method 1200 may return to operation 1204 to implement additional iterations of the method to write additional data to free blocks of the memory. Alternatively, a next access of the memory may be a data read access, for which the address manager may implement operations of the method 1300 of FIG. 13 or other data read methods.

Figure 13:
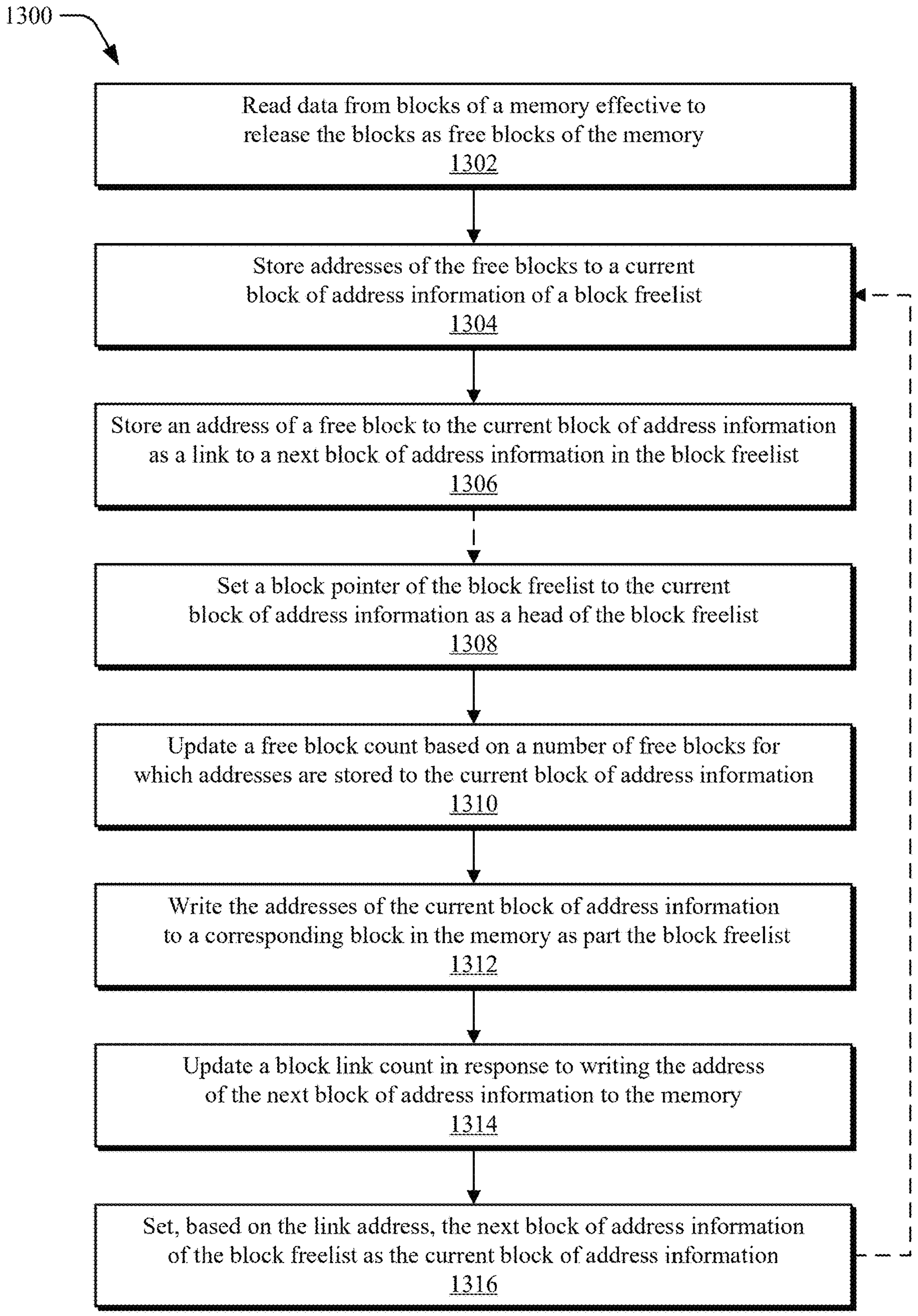
FIG. 13 depicts an example method for updating various state information of a linked list of address storage blocks as a memory controller reads data from a memory.

FIG. 13 depicts an example method 1300 for updating various state information of a linked list of address storage blocks as a memory controller reads data from a memory At 1302, a memory controller reads data from blocks of a memory effective to release the blocks of the memory (e.g., external memory). The memory controller may read the data from the blocks in response to receiving a request from a host to load a page of data from the memory attached to the memory controller. As the data is read from one or more blocks of the memory, the memory controller or an address manager may release the blocks as free blocks in the memory. At 1304, an address manager stores addresses of the free blocks to a current block of address information of a block freelist. As described herein, the block freelist may be stored in the memory as multiple blocks of address information or address storage blocks, each of which may be chained to a next by a link address stored in the block. The current block of address information may be held in an address buffer or address cache of the memory controller.

At 1306, the address manager stores an address of a free block to the current block of address information as a link to the next block of address information in the block freelist. The free block may be a first free block available to the address manager to claim as the next block of address information in a sequence of multiple blocks of address information. The address manager can store the link address as a first block address in the current block of address information or as a last block address in the current block. Optionally at 1308, the address manager sets a block pointer of the block freelist to the current block of address information as a head of the block freelist. For example, if the current block of address information is a first block of address information in the block freelist, the block pointer may be set to the current block. If the current block of address information is not the head of the block freelist, the address manager may leave the block pointer set to the head of the block freelist.

At 1310, the address manager updates a free block count based on a number of free blocks for which addresses are stored to the current block of address information. For example, if the current block of address information can store 128 block addresses and one address is the link address to the next block of address information, the free block count may be increased by 127 blocks when the current block of address information is full. At 1312, the memory controller writes the addresses of the current block of address information to a corresponding block in the memory as part of the block freelist. For example, if a block address of a block claimed for the block freelist was pushed based on a link address of a preceding block of address storage, the address manager can direct the memory controller to write the addresses of the current block to memory at the block address that was pushed.

At 1314, the address manager updates a block link count in response to writing the link address of the next block of address information to the memory. The address manager may increment the block link count based on the link address of the next block being added to the block freelist of linked address storage blocks in the memory. At 1316, the address manager sets, based on the link address, the next block of address information as the current block of address information. For example, the address manager may push the link address of the next block of address information and allocate or configure the address buffer to store free block addresses to be written back to the pushed link address. From operation 1316, the method 1300 may return to operation 1304 to store additional address of free blocks to the current block of address information, and the address manager may continue to build the linked list of free blocks. Alternatively, after the read operation is complete, a next access of the memory may be a data write access, for which the address manager may implement operations of the method 1200 of FIG. 12 or other data write.

Figure 14:
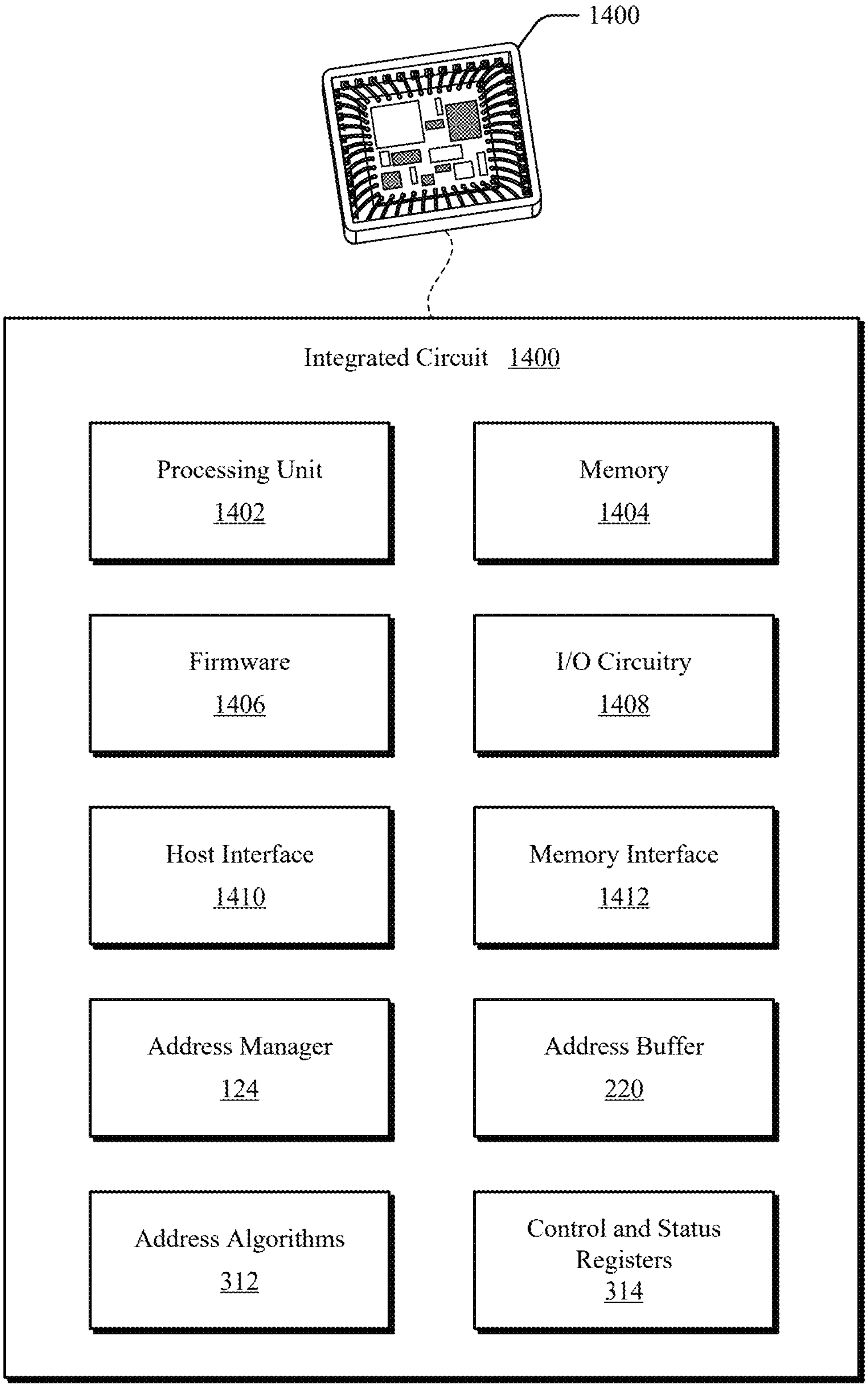
FIG. 14 illustrates an example integrated circuit environment in which aspects of free block address management for compressed data storage can be implemented.

FIG. 14 illustrates an example integrated circuit (IC) 1400 environment in which aspects of free block address management for compressed data storage can be implemented. The IC 1400 may be implemented in any suitable system or device, such as a memory-based peripheral card, a memory system, a memory expansion system, a memory pooling system, or a memory accelerator. Although described with reference to an IC, the entities of FIG. 14 may also be implemented as other types of embedded systems or integrated circuits, such as an ASIC, an SoC, a memory controller, a storage controller, a communication controller, a DSP, a programmable SoC (PSoC), a system-in-package (SiP), or an FPGA.

The IC 1400 may be integrated with electronic circuitry, a microprocessor, memory, input-output (I/O) control logic, a memory interface, a host interface, firmware, and/or software useful to provide functionalities of a computing device, a host system, a memory system, or a storage system, such as any of the devices or components described herein (e.g., memory controller, memory accelerator, CXL cache controller). The IC 1400 may also include a data bus (e.g., cross bar or interconnect fabric) that couples the various components of the IC for control signaling, data communication, and/or routing data between the components. The data bus or components of the IC 1400 may be exposed or accessed through an external port, which may include a data interface, a fabric-based interface, a peripheral component interface (e.g., PCIe-based interface), or any other suitable data interface.

In this example, the IC 1400 includes a hardware-based processing unit (e.g., processor core, CPU) and a hardware-based memory 1404. The processor processing unit 1402 may be configured as any suitable type of processer, such as an application processor or multi-core processor. The memory 1404 may include any suitable type of memory, such as volatile memory (e.g., DRAM), non-volatile memory (e.g., flash memory), and the like. The memory 1404 or other storage media of the IC 1400 are implemented as a processor-accessible storage medium, and thus do not include transitory propagating signals or carrier waves. Generally, the memory 1404 can store data and processor-executable instructions of the IC 1400, such as an operating system, firmware 1406, boot code, or applications. The processing unit 1402 can execute an operating system, firmware 1406, or applications from the memory 1404 to implement functions of the IC 1400 or functions of a system or device in which the IC 1400 is embodied. In some aspects, the processing unit 1402 and code stored on the memory 1404 are implemented as a memory controller, cache controller, or memory accelerator to provide various functionalities associated with free block address management for compressed data storage.

The IC 1400 may also include I/O circuitry 1408, which can be configured to provide a variety of I/O logic, ports, or data interfaces for inter-chip or off-chip communication. These data interfaces may include any suitable type of interface, such as an interface to a host device or other peripheral components. In this example, the IC 1400 includes a host interface 1410 configured to enable communication with a host system and a memory interface 1412 configured to enable communication and/or data transfers with a memory device or memory module. As described herein, the host interface 1410 may be configured as a PCIe interface over which the IC 1400 communicates using a CXL protocol. Alternatively or additionally, the memory interface can be configured to operate in compliance with a DDR memory protocol for enabling data transfers between the IC 1400 and the memory device.

In aspects, the IC 1400 includes an address manager 124, address buffer 220 (or cache), address algorithms 312, and control and status registers 314 (CSRs 314), which may be implemented separately or combined with a memory controller, a host interface, or a memory interface. For example, the IC 1400 may be implemented as a memory controller operably coupled between a host system and an external memory to which host access is enabled by the IC 1400. In accordance with various aspects of free block address management, the address manager 124 may maintain a block freelist or free pool of memory blocks as a linked list formed by chaining address storage blocks stored in a memory. As the IC 1400 (e.g., as a memory controller) writes compressed data to the free blocks of a memory and consumes the addresses stored in the address storage blocks, the address manager 124 can release the address storage blocks as free blocks back to the block freelist. When the free blocks and associated addresses are used up, the remaining address storage blocks are released (e.g., when empty), and no memory is needed to maintain the list of free blocks. By so doing, the address manager 124 and aspects described herein can reduce block management overheard and improve memory efficiency for compressed data storage.

Any of the entities of the IC 1400 can be embodied as separate or combined components, as described with reference to various aspects presented herein. For example, the address manager 124 may be implemented as part of a memory controller or compression engine, or other memory system component. Examples of these components and/or entities, or of corresponding functionality, are described with reference to the respective components or entities of the operating environment 100, example configurations of computing systems 200, example memory system 300, example memory 500, and/or the methods 600, 700, 800, 1000, 1200, and 1300. The address manager 124 or components thereof, either in whole or in part, may be implemented as processor-executable instructions maintained by the memory 1404 and executed by the processing unit 1402 to implement various aspects and/or features of free block address management for compressed data storage. Alternatively or additionally, the address manager 124, address buffer 220, address algorithms 312, CSRs 314, and/or other components of the IC 1400 may be implemented as hardware, firmware, fixed logic circuitry, or any combination thereof.

Although aspects of free block address management for compressed data storage have been disclosed in the context of language specific to certain features and/or operations, the subject matter recited by the appended claims is not necessarily limited to the specific features, operations, or method flows described herein. Rather, the specific features and operations are described throughout the disclosure as a variety of examples for implementing aspects of free block address management.

What is claimed is:

1. A method for managing addresses of free blocks of a memory, the method comprising:

receiving, at a memory controller and from a host, a request to store data to a memory coupled to the memory controller;

compressing the data to provide compressed data;

loading, from the memory to a storage element of the memory controller, a block of address information of a block freelist that is stored in the memory as multiple blocks of address information;

releasing, after loading the block of address information to the storage element of the memory controller, the block of address information maintained in the memory to the block freelist;

obtaining addresses of free blocks of the memory from the block of address information of the block freelist; and writing, by the memory controller and based on the addresses obtained from the block of address information, the compressed data to the free blocks of the memory.

2. The method as recited in claim 1, further comprising:

updating state information of the block freelist to reflect releasing of the block of address information to the block freelist.

3. The method as recited in claim 1, wherein:

the block of address information of the block freelist is loaded from the memory based on an address block pointer of the block freelist, and the method further comprises:

updating, based on an address stored in the block of address information, the address block pointer to an address of a next block of address information of the block freelist.

4. The method as recited in claim 1, wherein the block of address information is released to the block freelist after the addresses of the block of address information are exhausted.

5. The method as recited in claim 1, wherein the block of address information is a current block of address information, and the method further comprises:

determining that the addresses of the current block of address information are exhausted;

loading, from the memory to the storage element of the memory controller, a next block of address information of the block freelist in response to determining that the addresses of the current block of address information are exhausted;

obtaining additional addresses of the free blocks of the memory from the next block of address information; and writing, based on the additional addresses obtained from the next block of address information, the compressed data to the free blocks of the memory.

6. The method as recited in claim 1, further comprising:

updating state information of the block freelist to reflect a number of the addresses used to write the compressed data to the free blocks of the memory.

7. The method as recited in claim 1, wherein the multiple blocks of address information of the block freelist comprise a sequence of address storage blocks storing the addresses of the free blocks of the memory.

8. The method as recited in claim 7, wherein each address storage block of the sequence of address storage blocks stores:

an address to a next address storage block in the sequence of address storage blocks to implement the block freelist as a linked list of the addresses of the free blocks of the memory.

9. An apparatus comprising:

a host interface;

a memory interface;

a compression engine;

a storage element;

a hardware-based processor configured to execute instructions; and a hardware-based memory storing processor-executable instructions that, responsive to execution, implement a memory controller with free block address management, the memory controller configured to:

receive, via the host interface, a request to store data to a memory coupled to the memory interface;

compress, via the compression engine, the data to provide compressed data;

load, from the memory to the storage element, a block of address information of a block freelist that is stored in the memory as multiple blocks of address information;

release, after loading the block of address information to the storage element of the memory controller, the block of address information maintained in the memory to the block freelist;

obtain addresses of free blocks of the memory from the block of address information of the block freelist; and write, based on the addresses obtained from the block of address information, the compressed data to the free blocks of the memory.

10. The apparatus as recited in claim 9, wherein the apparatus comprises a register configured to maintain state information of the block freelist, and the memory controller is further configured to:

update state information maintained by the register to reflect release of the block of address information to the block freelist.

11. The apparatus as recited in claim 9, wherein the memory controller is further configured to release the block of address information to the block freelist after the addresses of the block of address information are exhausted.

12. The apparatus as recited in claim 9, wherein the block of address information is a current block of address information and the memory controller is further configured to:

load, from the memory to the storage element, a next block of address information of the block freelist when the addresses of the current block of address information are exhausted;

obtain additional addresses of the free blocks of the memory from the next block of address information; and write, based on the additional addresses obtained from the next block of address information, the compressed data to the free blocks of the memory.

13. The apparatus as recited in claim 9, wherein the multiple blocks of address information of the block freelist stored in the memory comprise a sequence of address storage blocks that each store:

respective addresses of the free blocks of the memory that are available to store data; and an address to a next address storage block in the sequence of address storage blocks to implement the block freelist as a linked list of the addresses of the free blocks of the memory.

14. The apparatus as recited in claim 9, wherein:

the host interface is configured to operate in compliance with a compute express link (CXL) protocol; or the memory interface is configured to operate in compliance with a double data rate (DDR) memory protocol.

15. The apparatus as recited in claim 9, wherein the apparatus is embodied as one of an integrated circuit, a system-on-chip, a memory-based peripheral card, a memory expansion system, a memory pooling system, a memory sharing system, or a memory accelerator.

16. An apparatus comprising:

a host interface;

a memory interface;

a storage element;

a compression engine; and means for:

receiving, via the host interface, a request to store data to a memory coupled to the memory interface;

compressing, via the compression engine, the data to provide compressed data;

loading, from the memory to the storage element, a block of address information of a block freelist that is stored in the memory as multiple blocks of address information;

releasing, after loading the block of address information to the storage element, the block of address information maintained in the memory to the block freelist;

obtaining addresses of free blocks of the memory from the block of address information of the block freelist; and writing, based on the addresses obtained from the block of address information, the compressed data to the free blocks of the memory.

17. The apparatus as recited in claim 16, further comprising means for:

updating state information of the block freelist to reflect releasing of the block of address information to the block freelist.

18. The apparatus as recited in claim 16, wherein the block of address information of the block freelist is loaded from the memory based on an address block pointer of the block freelist, and the apparatus further comprises means for:

updating, based on an address stored in the block of address information, the address block pointer to an address of a next block of address information of the block freelist.

19. The apparatus as recited in claim 16, further comprising means for:

updating state information of the block freelist to reflect a number of the addresses used to write the compressed data to the free blocks of the memory.

20. The apparatus as recited in claim 16, wherein the multiple blocks of address information of the block freelist comprise a sequence of address storage blocks storing the addresses of the free blocks of the memory.

* * * * *